United States Patent
Wang et al.

(10) Patent No.: US 11,533,704 B2
(45) Date of Patent: Dec. 20, 2022

(54) PAGING MESSAGE TRANSMISSION METHOD AND APPARATUS

(71) Applicant: HUAWEI TECHNOLOGIES CO., LTD., Guangdong (CN)

(72) Inventors: Junwei Wang, Shenzhen (CN); Xiangdong Zhang, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 48 days.

(21) Appl. No.: 17/091,836

(22) Filed: Nov. 6, 2020

(65) Prior Publication Data

US 2021/0058894 A1  Feb. 25, 2021

Related U.S. Application Data

(63) Continuation of application No. PCT/CN2019/086480, filed on May 10, 2019.

(30) Foreign Application Priority Data

May 11, 2018  (CN) .......................... 201810451239.9

(51) Int. Cl.
*H04W 68/00* (2009.01)
*H04W 76/27* (2018.01)
(Continued)

(52) U.S. Cl.
CPC ....... *H04W 68/005* (2013.01); *H04W 72/042* (2013.01); *H04W 72/0446* (2013.01);
(Continued)

(58) Field of Classification Search
None
See application file for complete search history.

(56) References Cited

U.S. PATENT DOCUMENTS

2017/0180951 A1  6/2017  Lee et al.
2019/0223160 A1*  7/2019  He ...................... H04W 72/042
(Continued)

FOREIGN PATENT DOCUMENTS

CN  103874170 A  6/2014
CN  104811279 A  7/2015
(Continued)

OTHER PUBLICATIONS

LG Electronics,"Paging design in NR", 3GPP TSG RAN WG1 Meeting #92bis, R1-1804537, Sanya, China, Apr. 16-20, 2018, total 5 pages.
(Continued)

*Primary Examiner* — Jamaal Henson
(74) *Attorney, Agent, or Firm* — Womble Bond Dickinson (US) LLP

(57) ABSTRACT

A paging message transmission method and apparatus are described. The method can include sending, by an access network device, a first paging message to a terminal device on a first paging occasion, where the first paging message comprises a first identifier and a preset time point for sending a second paging message, the first identifier indicates the first paging message is a short message, and the second paging message is a message for terminal paging. The method can also include sending, by the access network device to the terminal device at the preset time point, scheduling information corresponding to the second paging message, and sending the second paging message on a time-frequency resource corresponding to the scheduling information.

12 Claims, 12 Drawing Sheets

(51) Int. Cl.
*H04W 72/04* (2009.01)
*H04W 72/12* (2009.01)

(52) U.S. Cl.
CPC ... *H04W 72/0453* (2013.01); *H04W 72/1273* (2013.01); *H04W 76/27* (2018.02)

(56) References Cited

U.S. PATENT DOCUMENTS

| | | | | |
|---|---|---|---|---|
| 2019/0239187 | A1* | 8/2019 | Islam | H04L 5/0048 |
| 2019/0313365 | A1* | 10/2019 | Islam | H04W 68/005 |
| 2019/0320455 | A1* | 10/2019 | Chen | H04W 48/12 |
| 2019/0334687 | A1* | 10/2019 | Su | H04L 5/0094 |
| 2019/0349902 | A1* | 11/2019 | Soriaga | H04W 64/00 |

FOREIGN PATENT DOCUMENTS

| | | | |
|---|---|---|---|
| CN | 105764139 A | 7/2016 | |
| CN | 106550452 A | 3/2017 | |
| EP | 3119144 A1 | 1/2017 | |
| WO | 2018127150 A1 | 7/2018 | |
| WO | WO-2019028863 A1 * | 2/2019 | ............ H04L 5/005 |
| WO | WO-2019192218 A1 * | 10/2019 | ........... H04L 1/1819 |
| WO | 2019214661 A1 | 11/2019 | |

OTHER PUBLICATIONS

3GPP TS 38.212 V15.1.1 (Apr. 2018),3rd Generation Partnership Project Technical Specification Group Radio Access Network;NR;Multiplexing and channel coding(Release 15), total 94 pages.
3GPP TS 38.211 V15.1.0 (Mar. 2018),3rd Generation Partnership Project Technical Specification Group Radio Access Network;NR;Physical channels and modulation(Release 15), total 90 pages.
Huawei et al,"Offline summary for AI 7.1.1.3 on Paging ", 3GPP TSG RAN WG1 Meeting #92bis, R1-1805508, Sanya, China, Apr. 16-20, 2018, total 5 pages.
Qualcomm Incorporated,"On remaining Issues in CBG-based (re)-transmission", 3GPP TSG RAN WG1 Meeting #91, R1-1720689, Nov. 27-Dec. 1, 2017, Reno, USA, total 3 pages.
3GPP TS 38.213 V15.1.0 (Mar. 2018),3rd Generation Partnership Project Technical Specification Group Radio Access Network;NR;Physical layer procedures for control(Release 15), total 77 pages.
Vivo,"Remaining issues on paging", 3GPP TSG RAN WG1 Meeting #93, R1-1806034, Busan, Korea, 21st May 25, 2018, total 3 pages.
LG Electronics,"Paging design in NR", 3GPP TSG RAN WG1 Meeting #Adhoc1801, R1-1800353, Vancouver, CA, Jan. 22-26, 2018, total 3 pages.
3GPP TS 38.214 V15.1.0 (Mar. 2018),3rd Generation Partnership Project;Technical Specification Group Radio Access Network;NR;Physical layer procedures for data (Release 15), total 77 pages.
CMCC,"Discussion on remaining issues for paging", 3GPP TSG RAN WG1 Meeting #93, R1-1806358, Busan, Korea, May 21-25, 2018, total 2 pages.
Huawei et al,"Offline summary for AI 7.1.3 on Paging",3GPP TSG RAN WG1 Ad Hoc Meeting, R1-1801084, Vancouver, Canada, Jan. 22-26, 2018, total 7 pages.
3GPP TS 38.300 V15.1.0 (Mar. 2018),3rd Generation Partnership Project;Technical Specification Group Radio Access Network;NR; NR and NG-RAN Overall Description;Stage 2(Release 15), total 71 pages.
3GPP TS 38.331 V15.1.0 (Mar. 2018),3rd Generation Partnership Project;Technical Specification Group Radio Access Network;NR-;Radio Resource Control (RRC) protocol specification(Release 15), total 268 pages.
3GPP TS 38.304 v1.0.1 (aPR. 2018),3rd Generation Partnership Project;Technical Specification Group Radio Access Network;NR;User Equipment (UE) procedures in Idle mode and RRC Inactive state(Release 15), total 21 pages.

* cited by examiner

Selectable preset position

PAGING MESSAGE TRANSMISSION METHOD AND APPARATUS

CROSS-REFERENCE TO RELATED APPLICATIONS

This application is a continuation of International Application No. PCT/CN2019/086480, filed on May 10, 2019, which claims priority to Chinese Patent Application No. 201810451239.9, filed on May 11, 2018. The disclosures of the aforementioned applications are hereby incorporated by reference in their entireties.

TECHNICAL FIELD

This application relates to the field of communications technologies, and in particular, to a paging message transmission method and apparatus.

BACKGROUND

In a mobile communications system, an access network sends paging messages to a terminal based on different service requirements. The paging messages sent by the access network are classified into two types. One type of paging message is a short message paging message, such as a system information update message or an earthquake and tsunami warning system (ETWS) message. A short message needs to be received by both a terminal device in a radio resource control (RRC) idle mode and a terminal device in an RRC connected mode. The other type of paging message is a paging message for terminal paging. Only the terminal device in an RRC idle mode needs to receive the paging message for terminal paging, and the terminal device in an RRC connected mode does not need to receive the paging message for terminal paging.

The access network needs to periodically send a paging message. One paging cycle may include a plurality of paging occasions (PO). Each terminal device can receive the paging message on only one paging occasion in one paging cycle. The access network sends the paging message on the PO. In a fifth generation (5G) system, an access network can transmit only one type of paging message on one PO. In this case, if the access network needs to send only a short message paging message, the access network sends the short message paging message on a physical downlink control channel (PDCCH) on the PO. A terminal device blindly detects the PDCCH on the PO, to obtain the short message paging message. If the access network needs to send only a paging message for terminal paging, the access network sends, on the PDCCH on the PO, downlink control information (DCI) corresponding to the paging message for terminal paging; and sends, on a physical downlink shared channel (PDSCH) indicated by the DCI, the paging message for terminal paging. The terminal blindly detects the PDCCH on the PO. After the DCI is obtained through blind detection, if the terminal device is in an RRC idle mode, the terminal demodulates the PDSCH corresponding to the DCI, to obtain the paging message for terminal paging. In this way, the terminal device in an RRC connected mode may receive only the short message paging message. Therefore, demodulation complexity of the terminal device in an RRC connected mode is reduced.

However, if the access network needs to send both the paging message for terminal paging and the short message paging message on a PO, the access network sends one of the two paging messages on the PO and sends the other message on the PO in a subsequent paging cycle. If the paging message that is to be sent on the PO in the subsequent paging cycle is a message for terminal paging, the paging message for terminal paging may not be sent in time. Consequently, user experience is relatively poor. If the paging message that is to be sent on the PO in the subsequent paging cycle is a short message, the paging message may not be sent for a long time in case of a critical emergency, for example, a tsunami or an earthquake during which paging messages need to be frequently sent.

SUMMARY

This application provides a paging message transmission method and apparatus, to resolve a problem of poor user experience that is caused because a message for terminal paging may not be sent in time or even be blocked after demodulation complexity of a terminal in an RRC connected mode is reduced.

According to a first aspect, this application provides a paging message transmission method, where the method includes: An access network device sends a first paging message to a terminal device on a first paging occasion, where the first paging message comprises a first identifier and a preset time point for sending a second paging message, the first identifier is used to identify that the first paging message is a short message, and the second paging message is a message for terminal paging. Then, the access network device sends, to the terminal device at the preset time point, scheduling information corresponding to the second paging message, and sends the second paging message on a time-frequency resource corresponding to the scheduling information. In this embodiment of this application, the access network device may set, based on a requirement, a time for the second paging message, and notify the terminal device of time information, so that the terminal device can receive the second paging message within the time notified by the access network device, and the second paging message does not need to wait to be sent on the paging occasion in a subsequent paging cycle. This avoids a problem that the paging message is not sent in time, and improves user experience without increasing demodulation complexity of the terminal device.

In a possible embodiment, before the access network device sends the first paging message to the terminal device on the first paging occasion, the access network device may determine that the first paging message and the second paging message need to be sent to the terminal device on the first paging occasion.

In a possible embodiment, duration of an interval between the preset time point and the first paging occasion may be less than a paging cycle. According to the foregoing embodiment, the access network device may send the second paging message at the preset time point, and the duration of the interval between the preset time point and the first paging occasion in a current paging cycle is less than the paging cycle. Therefore, a delay of sending the second paging message is less than the paging cycle. In comparison with prior approaches in which the access network device can send the second paging message only on the first paging occasion in a subsequent paging cycle, and consequently, the delay of sending the second paging message is at least one paging cycle, the foregoing embodiment can reduce the delay of sending the second paging message, and improve user experience.

In a possible embodiment, the preset time point may be a second paging occasion, and the second paging occasion is another paging occasion in the paging cycle. In this case, the access network device sends the second paging message on the second paging occasion.

In a possible embodiment, the preset time point may alternatively be a moment that is n slots apart from the first paging occasion in the current paging cycle. In this case, the access network device sends the second paging message at a moment that is n slots after the first paging occasion, in the current paging cycle, on which the first paging message is sent. n is an integer not less than 0. When n is equal to 0, the preset time point is used to indicate that the terminal device does not need to receive the second paging message.

In a possible embodiment, the preset time point may alternatively be a time window. The access network device sends the second paging message in any slot in the time window.

In a possible embodiment, if the preset time point is a preset value, for example, the preset value is 0, the preset time point is used to indicate that the terminal device does not need to receive the second paging message.

In a possible embodiment, the access network device and the terminal device may alternatively agree in advance on at least one preset time point and a corresponding identifier. In this way, when the access network device sends the first paging message, an identifier of a preset time point is included, to indicate the terminal device to receive the second paging message at the preset time point corresponding to the identifier.

In a possible embodiment, the first paging message may further include a second identifier, and the second identifier is used to indicate the terminal device to receive the second paging message. In the foregoing embodiment, the terminal device may determine, by determining whether the first paging message includes the second identifier, whether to obtain a preset time point carried in the first paging message. When the first paging message does not include the second identifier, the terminal device does not decode a field of the preset time point carried in the first paging message. In comparison with decoding of all bits included in the field of the preset time point carried in the first paging message, this can reduce decoding complexity of the terminal devicepreset time point.

In a possible embodiment, the access network device may send a pilot signal to the terminal device, where the pilot signal is used to assist the terminal device in receiving the second paging message. In the foregoing embodiment, the access network device may send the pilot signal to the terminal device to assist the terminal device in performing time or/and frequency synchronization when the terminal device receives the second paging message. This can help improve precision of demodulating the second paging message by the terminal device.

In the foregoing embodiment, that the access network device sends, to the terminal device at the preset time point, scheduling information corresponding to the second paging message includes: The access network device sends the scheduling information to the terminal device in a preset time point-frequency resource set and a preset search space at the preset time point, where the preset time point-frequency resource set is a time-frequency resource set carrying the first paging message, and the preset search space is a search space carrying the first paging message. In the foregoing embodiment, the access network device sends DCI information of the second paging message by using a CORESET and a search space that are used for sending the first paging message on the first paging occasion in the current paging cycle. In this case, when blindly detecting the DCI information of the second paging message, the terminal device may blindly detect only the CORESET and the search space that correspond to the first paging occasion in the current paging cycle, and the access network device may not need to reconfigure a CORESET and a search space for the second paging message. In addition, the access network device limits the search space for the second paging message, to narrow a scope in which the terminal device performs blind detection. This can improve blind detection efficiency of the terminal device.

According to a second aspect, this application provides a paging message transmission method, where the method includes: A terminal device receives, on a first paging occasion, a first paging message sent by an access network device, where the first paging message includes a first identifier and a preset time point for sending a second paging message, the first identifier is used to identify that the first paging message is a short message, and the second paging message is a message for terminal paging; the terminal device parses the first paging message; and when the terminal device is in an RRC idle mode, the terminal device receives, at the preset time point, scheduling information that corresponds to the second paging message and that is sent by the access network device, and receives, on a time-frequency resource corresponding to the scheduling information, the second paging message sent by the access network device. In this embodiment of this application, the terminal device may receive the second paging message at the preset time point notified by the access network device, and does not need to wait to receive the second paging message on the paging occasion in a subsequent paging cycle. This avoids a problem that the second paging message cannot be sent in time.

In a possible embodiment, duration of an interval between the preset time point and the first paging occasion is less than a paging cycle. According to the foregoing embodiment, the terminal device may receive the second paging message at the preset time point, and the duration of the interval between the preset time point and the first PO in a current paging cycle is less than the paging cycle. Therefore, a delay of receiving the second paging message is less than the paging cycle. In comparison with the prior approaches in which the terminal device can receive the second paging message only after waiting for at least one paging cycle, the foregoing embodiment can reduce the delay of receiving the second paging message, and improve user experience.

In a possible embodiment, if the preset time point is a preset value, for example, the preset value is 0, the preset time point is used to indicate that the terminal device does not need to receive the second paging message.

In a possible embodiment, duration of an interval between the preset time point and the first paging occasion may be less than a paging cycle. According to the foregoing embodiment, the access network device may send the second paging message at the preset time point, and the duration of the interval between the preset time point and the first PO in a current paging cycle is less than the paging cycle. Therefore, a delay of sending the second paging message is less than the paging cycle. In comparison with the prior approaches in which the access network device can send the second paging message only on the first PO in a subsequent paging cycle, and consequently, the delay of sending the second paging message is at least one paging cycle, the foregoing embodiment can reduce the delay of sending the second paging message, and improve user experience.

In a possible embodiment, the preset time point may be a second paging occasion, and the second paging occasion is another paging occasion in the paging cycle. In this case, the terminal device receives the second paging message on the second paging occasion.

In a possible embodiment, the preset time point may alternatively be a moment that is n slots apart from the first paging occasion in the current paging cycle. In this case, the terminal device starts to receive the second paging message at a moment that is n slots after the first paging occasion, in the current paging cycle, on which the first paging message is sent. n is an integer not less than 0. When n is equal to 0, the preset time point is used to indicate that the terminal device does not need to receive the second paging message.

In a possible embodiment, the preset time point may alternatively be a time window. The terminal device blindly detects the second paging message when the time window starts, and stops blindly detecting the second paging message when the second paging message is blindly detected or when the time window ends.

In a possible embodiment, the access network device and the terminal device may alternatively agree in advance on at least one preset time point and a corresponding identifier. In this way, the terminal device determines, based on an identifier that is of a preset time point and that is included in the first paging message, a time for receiving the second paging message, and receives the second paging message at the preset time point corresponding to the identifier.

In a possible embodiment, the first paging message may further include a second identifier, and the second identifier is used to indicate the terminal device to receive the second paging message. In the foregoing embodiment, when the first paging message does not include the second identifier, the terminal device may determine that the access network device does not need to send the message for terminal paging, and does not decode a field of the preset time point carried in the first paging message. In comparison with decoding of all bits included in the field of the preset time point carried in the first paging message, this can reduce decoding complexity of the terminal devicepreset time point.

In a possible embodiment, the second paging message includes a first pilot signal. The terminal device may receive a second pilot signal sent by the access network device and demodulate the second paging message based on the first pilot signal and the second pilot signal. The second pilot signal is used to assist the terminal device in receiving the second paging message. In the foregoing embodiment, the terminal device may perform time synchronization or/and frequency synchronization based on the first pilot signal sent by the access network device and the second pilot signal included in the second paging message. This can improve precision of demodulating the second paging message.

In a possible embodiment, that the terminal device receives, at the preset time point, scheduling information sent by the access network device includes: The terminal device blindly detects the scheduling information in a preset time point-frequency resource set and a preset search space at the preset time point, where the preset time point-frequency resource set is a time-frequency resource set carrying the first paging message, and the preset search space is a search space carrying the first paging message. In the foregoing embodiment, when blindly detecting DCI information of the second paging message, the terminal device may blindly detect only a CORESET and a search space that correspond to the first paging occasion in the current paging cycle. In comparison with large-scale blind detection performed on time-frequency resources, the access network device may limit the search space for the second paging message, to narrow a scope in which the terminal device performs blind detection. This can improve blind detection efficiency of the terminal device.

According to a third aspect, this application provides a paging message transmission method, and the method includes: An access network device compresses scheduling information corresponding to a first paging message, where the first paging message is a message for terminal paging, and a quantity of bits occupied by compressed scheduling information is not greater than a preset bit quantity. The access network device sends a second paging message to a terminal device when a first paging occasion arrives, and sends the first paging message on a time-frequency resource corresponding to the compressed scheduling information, where the second paging message includes a first identifier and the compressed scheduling information, and the first identifier is used to identify that the second paging message is a short message. In this embodiment of this application, the access network device compresses the scheduling information corresponding to the first paging message, to reduce a quantity of bits occupied by the scheduling information. In this way, the scheduling information can be carried in reserved bits in the second paging message. Therefore, on the premise that demodulation complexity of the terminal device is not increased, the terminal device can receive the message for terminal paging and the short message on the first paging occasion in a current paging cycle. This can improve user experience.

In a possible embodiment, that the access network device compresses the scheduling information corresponding to the first paging message includes: The access network device limits a mapping mode of the first paging message on a frequency domain resource. In the foregoing embodiment, the access network device limits the mapping mode of the first paging message on the frequency domain resource, and therefore types of mapping modes available for the first paging message may be reduced. In this way, fewer bits in the scheduling information of the first paging message may be used to indicate the mapping mode of the first paging message. For example, if the access network device does not limit the mapping mode of the first paging message on the frequency domain resource, eight types of mapping modes are available for the first paging message. In this case, 4 bits in the scheduling information of the first paging message need to be used to indicate the mapping mode of the first paging message. If the access network device limits the mapping mode of the first paging message on the frequency domain resource, four types of mapping modes are available for the first paging message. In this case, 2 bits in the scheduling information of the first paging message need to be used to indicate the mapping mode of the first paging message. It can be learned that a quantity of bits occupied by the scheduling information of the first paging message is reduced by 2 bits after the access network device limits the mapping mode of the first paging message on the frequency domain resource.

In a possible embodiment, that the access network device limits a mapping mode of the first paging message on a frequency domain resource includes: The access network device maps the first paging message starting from a preset position on the frequency domain resource. Alternatively, the access network device maps the first paging message onto the frequency domain resource in a non-interleaved mapping mode. Alternatively, the access network device reduces types of modulation formats available for the first paging message.

In a possible embodiment, the second paging message may further include a second identifier, and the second identifier is used to indicate the terminal device to receive the first paging message. In the foregoing embodiment, the terminal device may determine, by determining whether the second paging message includes the second identifier, whether to obtain the scheduling information included in the second paging message. When the second paging message does not include the second identifier, the terminal device does not decode a field that carries the scheduling information and that is in the second paging message. In comparison with decoding of all bits included in the second paging message, this can reduce decoding complexity of the terminal device.

According to a fourth aspect, this application provides a paging message transmission method, where the method includes: A terminal device receives, on a first paging occasion, a first paging message sent by an access network device, where the first paging message includes a first identifier and scheduling information. The first identifier is used to identify that the first paging message is a short message. The scheduling information is used to indicate a time-frequency resource carrying a second paging message, and a quantity of bits occupied by the scheduling information is not greater than a preset bit quantity. The second paging message is a message for terminal paging. The terminal device parses the first paging message. When the terminal device is in an RRC idle mode, the terminal device receives the second paging message on the time-frequency resource corresponding to the scheduling information. In this embodiment of this application, the access network device compresses the scheduling information corresponding to the second paging message, to reduce a quantity of bits occupied by the scheduling information. In this way, the scheduling information can be carried in reserved bits in the first paging message. Therefore, on the premise that demodulation complexity of the terminal device is not increased, the terminal device can receive the message for terminal paging and the short message on the first paging occasion in a current paging cycle. This can improve user experience.

In a possible embodiment, the scheduling information is determined by the access network device after the access network device limits a mapping mode of the second paging message on the frequency domain resource. In the foregoing embodiment, the access network device limits the mapping mode of the first paging message on the frequency domain resource, and therefore types of mapping modes available for the first paging message may be reduced. In this way, fewer bits in the scheduling information of the first paging message may be used to indicate the mapping mode of the first paging message.

In a possible embodiment, the first paging message further includes a second identifier, and the second identifier is used to indicate the terminal device to receive the second paging message. In the foregoing embodiment, when the first paging message does not include the second identifier, the terminal device may determine that the access network device does not need to send the message for terminal paging, and does not decode a field of a preset time point carried in the first paging message. In comparison with decoding of all bits included in the field of the preset time point carried in the first paging message, this can reduce decoding complexity of the terminal devicepreset time point.

According to a fifth aspect, an embodiment of this application provides a paging message transmission method, and the method includes: An access network device sends a paging message to a terminal device, where the paging message is used to indicate that first system information is updated, and the first system information may be RMSI, or may be a SIB 1. The terminal device receives the paging message sent by the access network device.

In a possible embodiment, the paging message may include first indication information. The first indication information is used to indicate that the update of the first system information is caused by a change of a broadcast status of second system information, and the second system information is system information sent by the access network device based on a requirement of the terminal device. Alternatively, the first indication information is used to indicate that the update of the first system information is not caused by a change of a broadcast status of second system information. In the foregoing embodiment, when receiving the paging message sent by the access network device, the terminal device may determine, based on the first indication information carried in the paging message, whether the first system information needs to be read. If the first indication information is used to indicate that the update of the first system information is caused by the change of the broadcast status of the second system information, but the terminal device does not need to receive any second system information, the terminal device does not need to reread the first system information. This can reduce waste caused by frequent reading of the first system information.

In a possible embodiment, the paging message may include second indication information, and the second indication information may include an identifier corresponding to at least one piece of second system information. In the foregoing embodiment, when receiving the paging message sent by the access network device, the terminal device may determine, based on the second indication information carried in the paging message, whether the first system information needs to be read. If the second indication information includes the identifier corresponding to the second system information that needs to be received by the terminal device, the terminal device needs to reread the first system information. Alternatively, if the second indication information does not include the identifier corresponding to the second system information that needs to be received by the terminal device, the terminal device does not need to reread the first system information. Alternatively, if the terminal device does not need to receive any second system information, the terminal device does not need to reread the first system information. This solution can reduce waste caused by frequent reading of the first system information.

In a possible embodiment, the paging message may include third indication information, and the third indication information may include broadcast status indication information corresponding to at least one piece of second system information. In the foregoing embodiment, when receiving the paging message sent by the access network device, the terminal device may learn, based on the third indication information carried in the paging message instead of by reading the SIB 1, of a broadcast status corresponding to the second system information that needs to be received. This reduces waste caused by frequent reading of the first system information.

In a possible embodiment, the third indication information may further include the identifier corresponding to each of the at least one piece of second system information.

In an embodiment of a possible implementation, when the access network device determines that the update of the first system information is caused by the change of the broadcast status of the second system information, the paging message may include any one of the foregoing three messages. When the access network device determines that the update of the first system information is not caused by the change of the broadcast status of the second system information, or the update of the first system information is caused not only by the change of the broadcast status of the second system information, the paging message may not include the foregoing three types of information. In this way, the terminal device may reread system information when determining that the paging message does not include the foregoing three types of information.

According to a sixth aspect, this application provides an access network device, where the access network device has a function of implementing an action of the access network device in the method embodiment in the first aspect or the third aspect. The function may be implemented by hardware, or may be implemented by hardware executing corresponding software. The hardware or the software includes one or more modules corresponding to the foregoing function.

In an embodiment of a possible implementation, the access network device includes a receiving unit, a sending unit, and a processing unit. These units may perform corresponding functions in the method example in the first aspect or the third aspect. For details, refer to the detailed descriptions in the method example. Details are not described herein again.

In an embodiment of a possible implementation, the access network device includes a transceiver, a memory, and a processor. The processor is configured to support the access network device in performing a corresponding function in the method provided in the first aspect or the third aspect. The memory is coupled to the processor, and the memory stores a program instruction and data that are necessary for the access network device.

According to a seventh aspect, this application provides a terminal device, where the terminal device has a function of implementing an action of the terminal device in the method embodiment in the second aspect or the fourth aspect. The function may be implemented by hardware, or may be implemented by hardware executing corresponding software. The hardware or the software includes one or more modules corresponding to the foregoing function.

In an embodiment of a possible implementation, the terminal device includes a receiving unit, a sending unit, and a processing unit. These units may perform corresponding functions in the method example in the second aspect or the fourth aspect. For details, refer to the detailed descriptions in the method example. Details are not described herein again.

In an embodiment of a possible implementation, the terminal device includes a transceiver, a memory, and a processor. The processor is configured to support the terminal device in performing a corresponding function in the method provided in the second aspect or the fourth aspect. The memory is coupled to the processor, and the memory stores a program instruction and data that are necessary for the terminal device.

According to an eighth aspect, this application further provides a computer-readable storage medium, configured to store a computer software instruction used to perform a function in any one of the first aspect to the fourth aspect or the embodiments in the first aspect to the fourth aspect. The computer software instruction includes a program designed to perform the method in any one of the first aspect to the fourth aspect or the embodiments in the first aspect to the fourth aspect.

According to a ninth aspect, an embodiment of this application provides a computer program product including an instruction. When the computer program product runs on a computer, the computer is enabled to perform the method in any one of the first aspect to the fourth aspect or the embodiments in the first aspect to the fourth aspect.

According to a tenth aspect, an embodiment of this application provides a chip. The chip is connected to a memory, and is configured to read and execute a software program stored in the memory, to perform the method in any one of the first aspect to the fourth aspect or the embodiments in any one of the first aspect to the fourth aspect.

DESCRIPTION OF EMBODIMENTS

To make the objectives, technical solutions, and advantages of this application clearer, the following further describes this application in detail with reference to the accompanying drawings.

Figure 1:
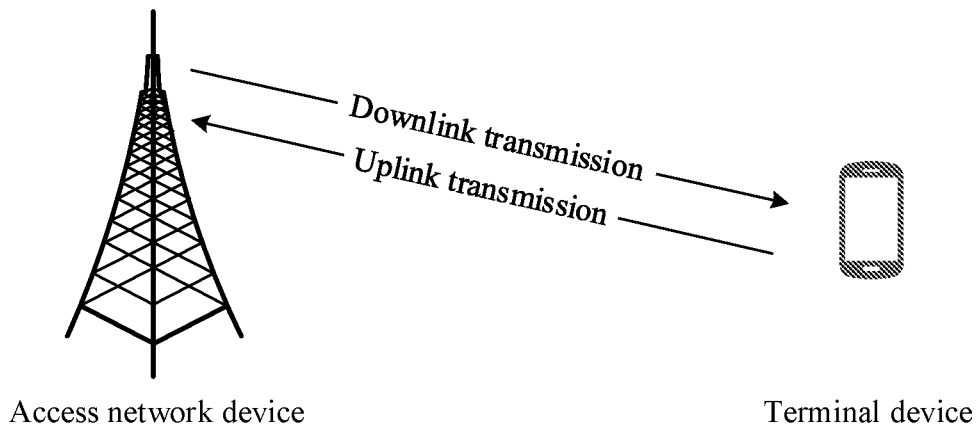
FIG. 1 is a schematic architectural diagram of a communications system according to this application.

A paging message transmission method provided in the embodiments of this application may be applied to a communications system. An architecture of the communications system may be shown in FIG. 1. The communications system includes an access network device and a terminal device. Uplink data transmission and downlink data transmission are performed between the access network device and the terminal device. The access network device may send paging messages to the terminal device based on different service requirements. The communications system in the embodiments of this application may include various types of communications systems, for example, may be a long term evolution (LTE) communications system, or a 5th generation (5G) communications system, or a hybrid architecture of LTE and 5G. In the communications system in the embodiments of this application, data may be transmitted between the access network device and the terminal device through but not limited to a radio wave, visible light, a laser, infrared light, a photon, a power line, an optical fiber, a coaxial cable, a copper twisted wire, or the like.

The access network device may be a common base station (for example, a Node B, an eNB, or the like), a new radio controller (NR controller), a gNodeB (gNB) in a 5G system, a centralized network element (e.g., a Centralized Unit), a new radio base station, a radio remote module, a micro base station, a relay, a distributed network element (e.g., a distributed unit), a reception point (e.g., a transmission reception point (TRP)), a transmission point (TP), or any other radio access device. This is not limited in the embodiments of this application.

The terminal device is also referred to as user equipment (UE) and is a device, for example, a handheld device or a vehicle-mounted device having a wireless connection function, providing voice and/or data connectivity for a user. A common terminal includes, for example, a mobile phone, a tablet, a notebook computer, a palmtop computer, a mobile internet device (MID), and a wearable device such as a smartwatch, a smart band, or a pedometer.

Figure 2:
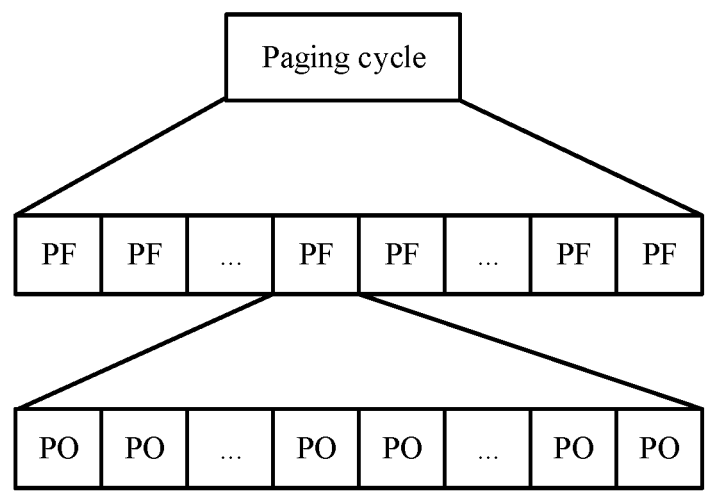
FIG. 2 is a schematic diagram of a paging cycle according to this application.

The paging messages sent by the access network device are classified into two types. One type of paging message is a short message paging message, such as a system information update message or a notification message used to notify the terminal device to obtain an earthquake and tsunami warning system message. The short message paging message needs to be received by both a terminal device in a radio resource control (RRC) idle mode and a terminal device in an RRC connected mode. The other type of paging message is a paging message for terminal paging. Usually, the paging message for terminal paging is a paging message sent to the access network device by a mobility management entity (MME). The paging message for terminal paging is sent only to the terminal device in an RRC idle mode. In other words, only the terminal device in an RRC idle mode needs to receive the paging message for terminal paging, and the terminal device in an RRC connected mode does not need to receive the paging message for terminal paging. The access network device needs to periodically send a paging message. As shown in FIG. 2, one paging cycle may include a plurality of paging frames (PF), and each PF may include a plurality of paging occasions (PO). In one paging cycle, each PO corresponds to one terminal device. In other words, each terminal device can receive a paging message on only one paging occasion in one paging cycle. Both the paging message for terminal paging and the short message paging message are sent on the PO.

In an LTE system, an access network device sends, on a physical downlink control channel (PDCCH) on a PO, downlink control information (DCI) corresponding to a paging message; and sends the paging message on a physical downlink shared channel (PDSCH) indicated by the DCI. A terminal device blindly detects the PDCCH on the PO by using a paging radio network temporary identifier (P-RNTI). After the DCI is blindly detected, the terminal device demodulates the PDSCH corresponding to the DCI, to obtain specific content of the paging message. However, in the LTE system, a paging message transmission method has the following problem: When the access network device sends a paging message for terminal paging, the terminal device in an RRC connected mode can learn, only after demodulating the PDSCH channel, that the paging message is the paging message for terminal paging. It can be learned that demodulation complexity of the terminal device is relatively high when the paging message transmission method in LTE is used.

To reduce demodulation complexity of the terminal device, so that the terminal device in an RRC connected mode may not need to demodulate the PDSCH but receive a short message paging message, a paging message in the following format is used in a 5G system to enable the access network device to send only one type of paging message on one PO. As shown in Table 1, a paging message includes a short message indication field and a message content field. The short message indication field is used to indicate a type of the paging message. The message content field indicates message content of a short message paging message or DCI information of a paging message for terminal paging.

TABLE 1

| Field | | Bit quantity | Remarks |
|---|---|---|---|
| Short message indication | | 1 | "0" indicates a short message "1" indicates a message for terminal paging |
| If a "short message indication" is 0, the short message is indicated, and content of the "message content" field is set as follows: | | | |
| Message content | Short message content | [8] | Defined at a higher layer |
| | Reserved bit | | |
| If a "short message indication" is 1, the message for terminal paging is indicated, and content of the "message content field" is set as follows: | | | |
| Message content | Frequency domain scheduling indication | X | Bandwidth related |
| | Time domain data | 4 | |
| | VRB-to-PRB mapping criterion | 1 | |
| | Format adjustment | 5 | |
| | Transport block scaling factor | 2 | |
| | Reserved bit | X | |

Figure 3:
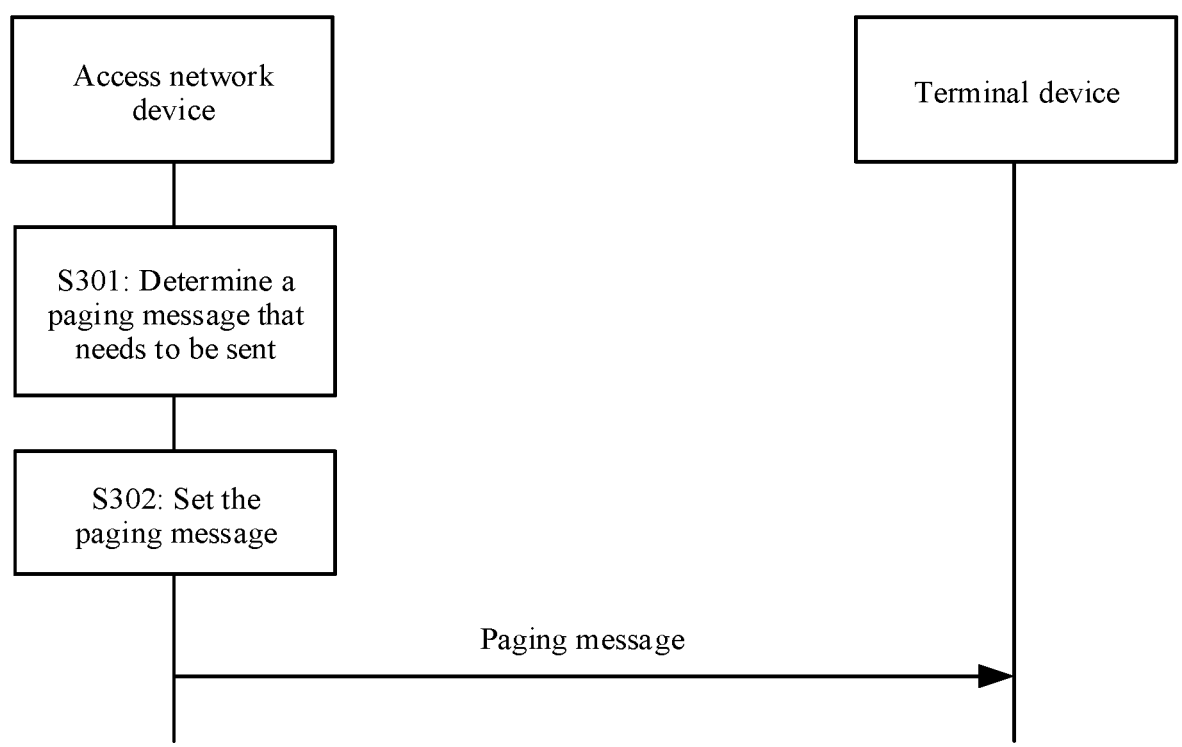
FIG. 3 is a flowchart of sending a paging message by an access network device sends in a 5G system according to this application.

Description of a paging message transmission method in the 5G system is provided by using an example in which the short message indication field of "0" indicates that the paging message is the short message paging message, and the short message indication field of "1" indicates that the paging message is the paging message for terminal paging. FIG. 3 is a flowchart of sending a paging message by an access network device in a 5G system.

S301: The access network device determines a paging message that needs to be sent.

If the access network device needs to send two paging messages, namely, a paging message for terminal paging and a short message paging message, the access network device selects one of the two paging messages as a message that needs to be sent on a PO in a current paging cycle, and sends the other message on the PO in a subsequent paging cycle.

S302: The access network device sets the paging message.

For example, if the message that needs to be sent in the current paging cycle is the short message paging message, a short message indication field in the paging message is set to "0", and a message content field in the paging message is set to specific message content that needs to be sent. For another example, if the message that needs to be sent in the current paging cycle is the paging message for terminal paging, the short message indication field in the paging message is set to "1", and the message content field in the paging message is set to DCI information corresponding to a PDSCH carrying specific message content. Then, the paging message is sent to a terminal device on a PDCCH.

Figure 4:
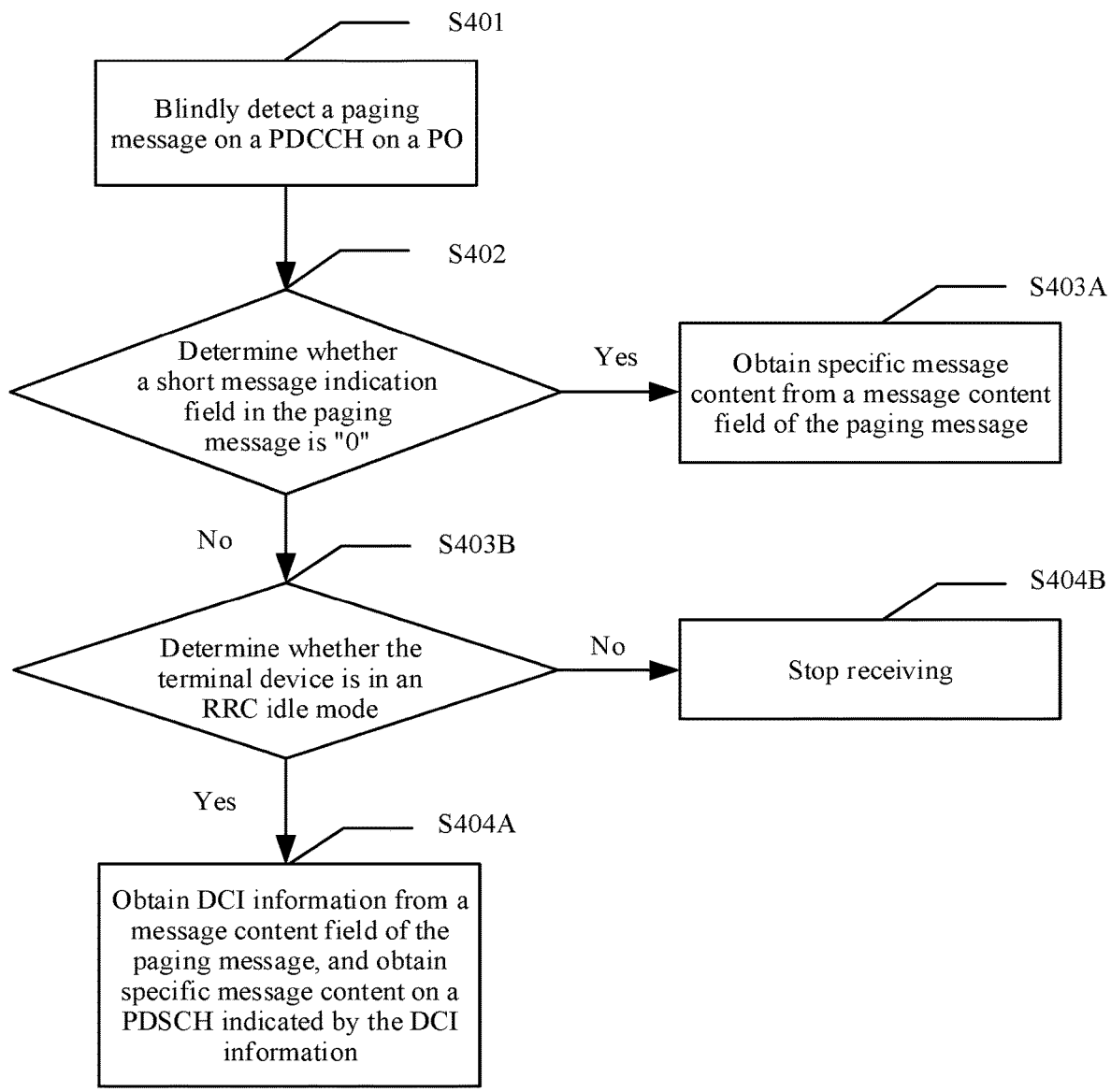
FIG. 4 is a flowchart of receiving a paging message by a terminal device in a 5G system according to this application.

FIG. 4 is a flowchart of receiving a paging message by a terminal device in a 5G system.

S401: The terminal device blindly detects a paging message on a PDCCH on a specific PO, where the specific PO is a PO allocated to the terminal device in POs included in a paging cycle.

S402: After the paging message is blindly detected, the terminal device determines whether a short message indication field in the paging message is "0", and performs step S403A if the short message indication field in the paging message is "0", or performs step S403B if the short message indication field in the paging message is not "0".

S403A: The terminal device obtains specific message content from a message content field of the paging message.

S403B. The terminal device determines whether the terminal device is in an RRC idle mode. If the terminal device is in an RRC idle mode, the terminal device performs step 404A. If the terminal device is not in an RRC idle mode, the terminal device performs step S404B.

S404A: The terminal device obtains DCI information from a message content field of the paging message, and obtains specific message content on a PDSCH indicated by the DCI information.

S404B. The terminal device stops receiving.

It can be learned from the foregoing process that, in the 5G system, when an access network device needs to send two paging messages, namely, a paging message for terminal paging and a short message paging message, the access network device sends one of the two paging messages on a PO in a current paging cycle, and sends the other paging message on the PO in a subsequent paging cycle. In this case, the other paging message is delayed for at least one paging cycle. Consequently, user experience is relatively poor.

In view of this, this application provides a paging message transmission method and apparatus, to resolve a problem of poor user experience that is caused because a message for terminal paging may not be sent in time or even be blocked after demodulation complexity of a terminal in an RRC connected mode is reduced. The method and the apparatus are based on a same inventive concept. Because principles of the method and the apparatus for resolving a problem are similar, mutual reference may be made between implementations of the apparatus and the method, and repeated descriptions are omitted.

In the embodiments of the present invention, "a plurality of" mentioned in the following embodiments of this application refers to two or more.

In addition, it should be understood that, in descriptions of this application, terms such as "first" and "second" are merely used for differentiation and description, but cannot be understood as an indication or implication of relative importance or an indication or implication of an order.

With reference to the accompanying drawings, the following describes in detail a paging message transmission method provided in this application.

Figure 5:
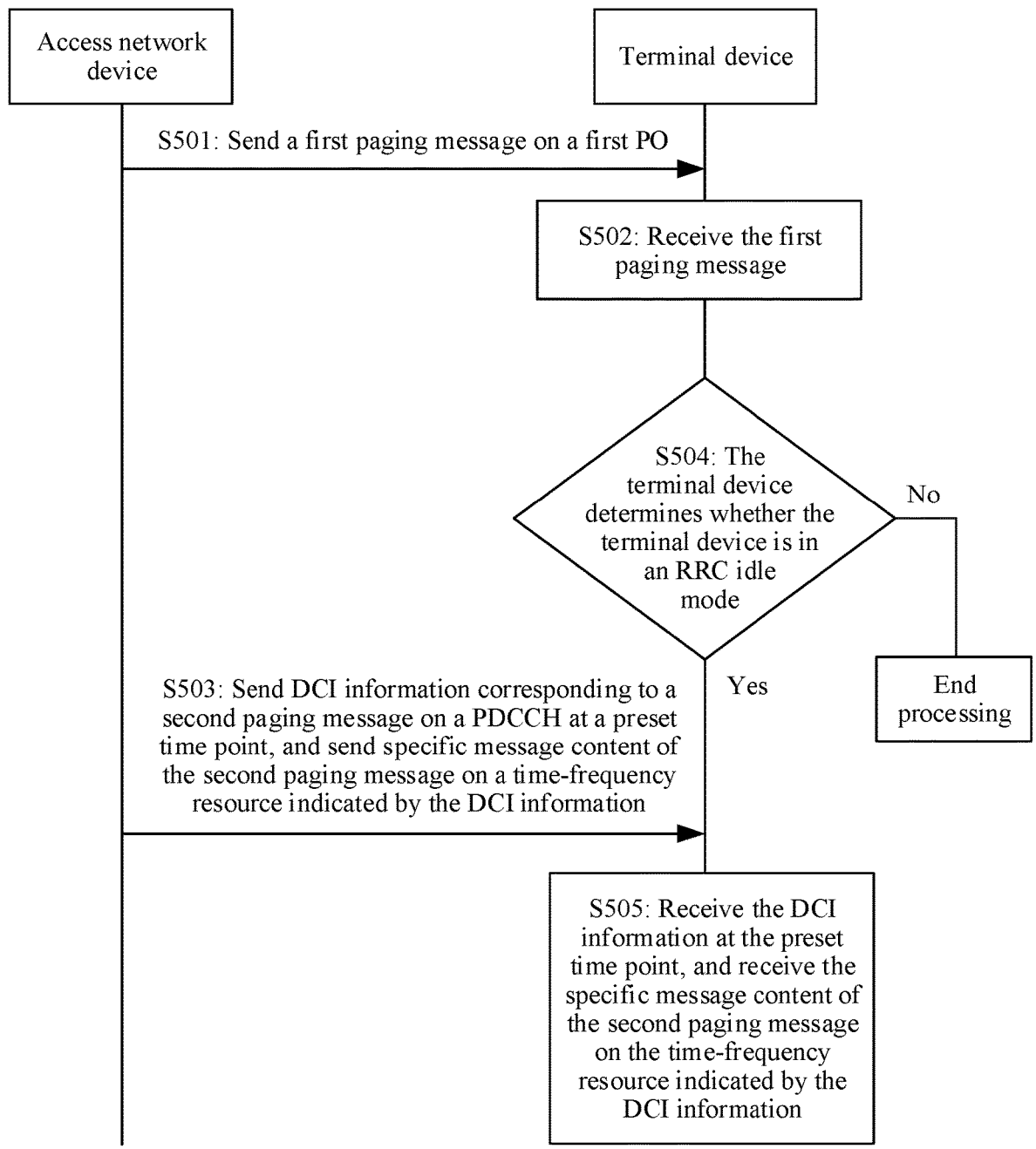
FIG. 5 is a schematic flowchart of a paging message transmission method according to this application.

FIG. 5 is a flowchart of a first paging message transmission method according to this application. The method includes the following steps.

S501: An access network device sends a first paging message to a terminal device on a first PO in a current paging cycle, where the first paging message is a short message and includes a preset time point for sending a second paging message, and the second paging message is a message for terminal paging. The first PO is a PO allocated to the terminal device.

S502: The terminal device receives, on the first PO in the current paging cycle, the first paging message sent by the access network device.

S503: The access network device sends DCI information corresponding to the second paging message on a PDCCH at the preset time point, and sends specific message content of the second paging message on a time-frequency resource indicated by the DCI information.

S504. The terminal device determines whether the terminal device is in an RRC idle mode. If the terminal device is in an RRC idle mode, the terminal device performs step S505. If the terminal device is not in an RRC idle mode, the processing ends.

S505: The terminal device receives the DCI information at the preset time point, and receives the specific message content of the second paging message on the time-frequency resource indicated by the DCI information.

In this embodiment of this application, when the access network device needs to send two paging messages, namely, a paging message for terminal paging and a short message paging message on the first PO in the current paging cycle, the access network device may send the short message on the first PO in the current paging cycle, and set a time based on a requirement, to send the message for terminal paging. In this case, the short message includes the preset time point for sending the message for terminal paging, to indicate the terminal device to receive, at the preset time point, the message for terminal paging. In this way, the message for terminal paging does not need to wait to be sent on the first PO in a subsequent cycle. Therefore, the terminal device can receive the message for terminal paging within the set time. This can shorten a waiting time of the terminal device and improve user experience.

In an embodiment of a possible implementation, duration of an interval between the preset time point and the first PO in the current paging cycle may be less than the paging cycle. In prior approaches, the access network device can send the second paging message only on the first PO in a subsequent paging cycle. Therefore, a delay of sending the second paging message is at least one paging cycle. However, in this embodiment of this application, the access network device can send the second paging message at the preset time point, and the duration of the interval between the preset time point and the first PO in the current paging cycle is less than the paging cycle. Therefore, a delay of sending the second paging message is less than the paging cycle. It can be learned that in this embodiment of this application, the delay of sending the second paging message can be reduced, and user experience can be improved.

Figure 6:
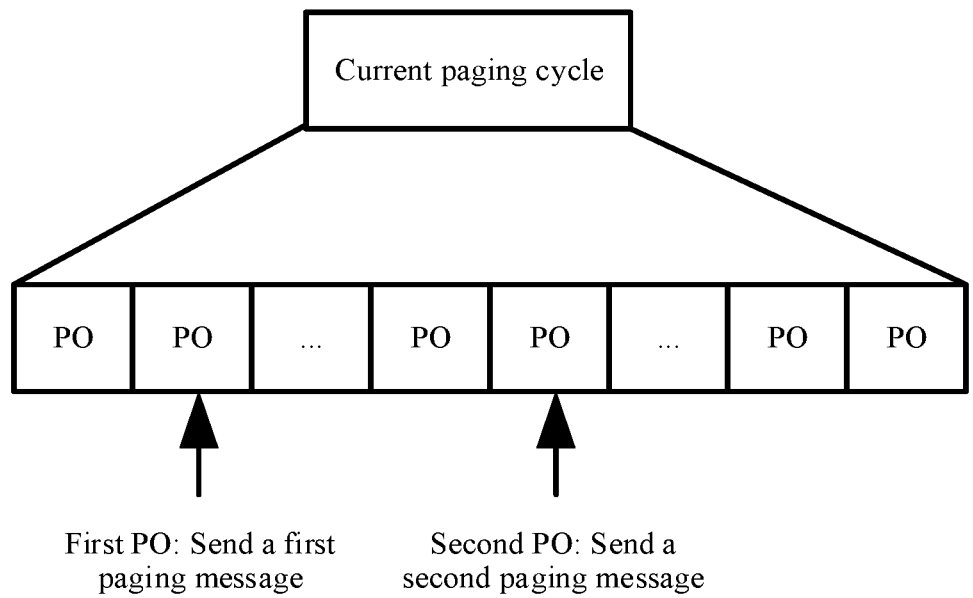
FIG. 6 is a schematic diagram of a preset time point according to this application.
Figure 7:
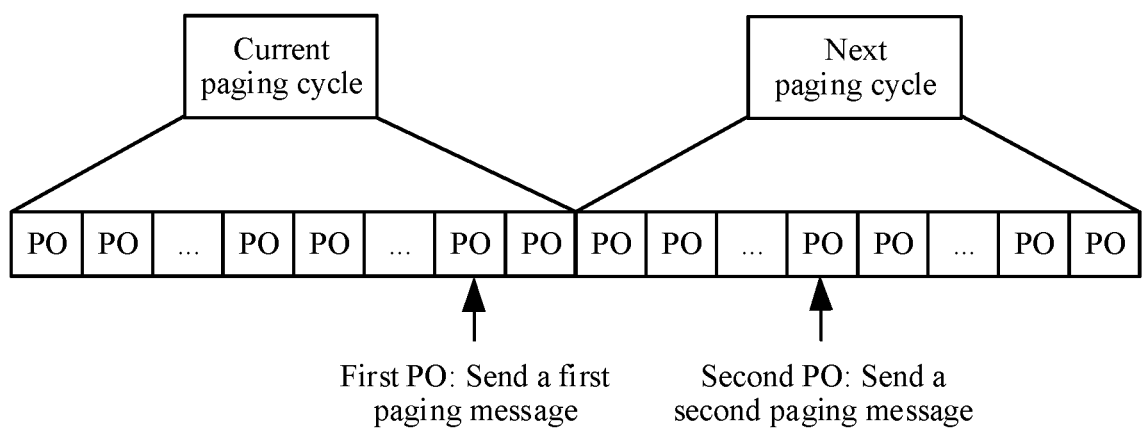
FIG. 7 is a schematic diagram of another preset time point according to this application.

For example, the preset time point may be a second PO, and the second PO is another PO in the paging cycle. In this case, the access network device sends the second paging message on the second PO. For example, a time relationship between the first PO in the current paging cycle and the second PO may be shown in FIG. 6 or FIG. 7. In this case, the terminal device may receive the DCI information corresponding to the second paging message on the second PO, and obtains the specific message content of the second paging message on the time-frequency resource corresponding to the DCI information.

Figure 8:
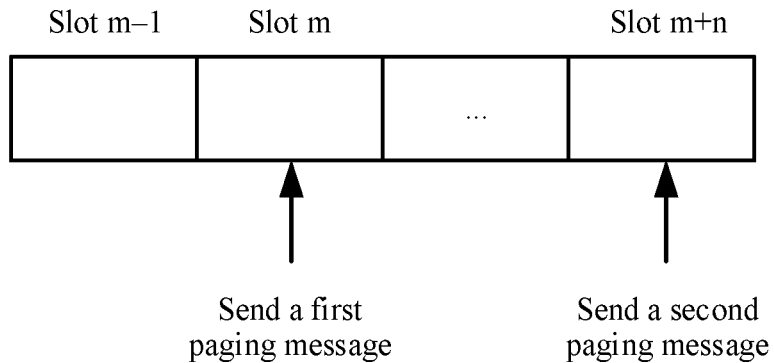
FIG. 8 is a schematic diagram of another preset time point according to this application.

Alternatively, the preset time point may be a moment that is n slots apart from the first PO in the current paging cycle, as shown in FIG. 8. n is an integer not less than 0. When n is equal to 0, the preset time point is used to indicate that the terminal device does not need to receive the second paging message. For example, n is equal to 3, in other words, the preset time point is a moment that is three slots apart from the first PO in the current paging cycle. In this case, the access network device sends the second paging message at the moment three slots after the first PO, in the current paging cycle, on which the first paging message is sent. Then, the terminal device may receive the second paging message at the moment n slots after the first PO, in the current paging cycle, on which the first paging message is sent.

Figure 9:
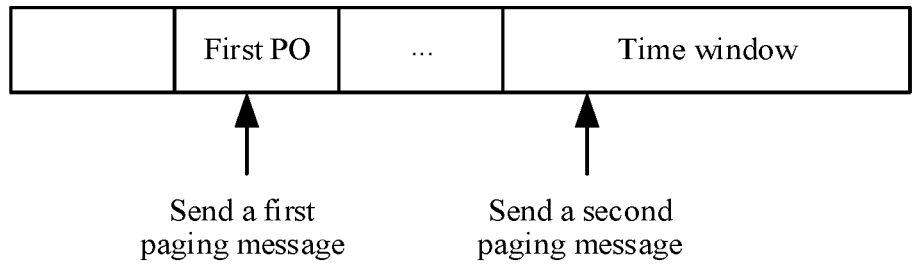
FIG. 9 is a schematic diagram of another preset time point according to this application.

The preset time point may alternatively be a time window, as shown in FIG. 9. The access network device sends the second paging message in any slot in the time window. Then, the terminal device may blindly detect the second paging message when the time window starts, and stop blindly detecting the second paging message when the second paging message is blindly detected or when the time window ends.

Alternatively, the access network device and the terminal device may agree in advance on at least one preset time point and a corresponding identifier. In this way, when the access network device sends the first paging message, an identifier of a preset time point is included, to indicate the terminal device to receive the second paging message at the preset time point. For example, the access network device and the terminal device agree in advance on four preset time points, as shown in Table 2.

TABLE 2

| Preset time point | Delayed slot quantity | Identifier corresponding to the preset time point |
|---|---|---|
| 1 | 2 | 00 |
| 2 | 4 | 01 |
| 3 | 6 | 10 |
| 4 | 8 | 11 |

The access network device includes an identifier "11" in the first paging message, to indicate the terminal device to send the second paging message at a moment eight slots after the first PO in the current paging cycle. It should be understood that the preset time point is later than the first PO in the current paging cycle.

Alternatively, the preset time point is a preset value. For example, the preset value is 0. In this case, the preset time point is used to indicate that the terminal device does not need to receive the second paging message.

In an embodiment of a possible implementation, the paging message sent by the access network device on the first PO may include a short message indication field, a message content field, and a newly added indication field. Herein, the paging message sent by the access network device on the first PO may be a paging message sent on the first PO in any paging cycle, and includes the first paging message sent by the access network device on the first PO in the current paging cycle. The short message indication field is used to indicate a type of the paging message. The short message indication field may use "0" to indicate a short message, and use "1" to indicate a message for terminal paging. Certainly, the short message indication field may alternatively use "1" to indicate a short message, and use "0" to indicate a message for terminal paging. When the short message indication field indicates the short message, the message content field may indicate specific content of the short message. When the short message indication field indicates the message for terminal paging, the message content field may indicate scheduling information of the message for terminal paging. When the short message indication field indicates the short message and the access network device needs to send the message for terminal paging, the newly added indication field indicates a preset time point for sending the message for terminal paging. When the short message indication field indicates the message for terminal paging or indicates the short message, and the access network device does not need to send the message for terminal paging, the newly added indication field indicates that there is no message for terminal paging.

The newly added indication field may be a newly added bit location in the paging message, as shown in Table 3.

TABLE 3

| Field | Bit quantity | Remarks |
|---|---|---|
| Short message indication | 1 | "0" indicates a short message; and "1" indicates a message for terminal paging. |
| Newly added indication | N | "Null" indicates no message for terminal paging; and non-null indicates a preset time point for sending a message for terminal paging. |

TABLE 3-continued

| Field | | Bit quantity | Remarks |
|---|---|---|---|
| If a "short message indication" is 0, the short message is indicated, and content of the "message content" field is set as follows: | | | |
| Message content | Short message content | [8] | Defined at a higher layer |
| | Reserved bit | | |
| If a "short message indication" is 1, the message for terminal paging is indicated, and content of the "message content" field is set as follows: | | | |
| Message content | Frequency domain scheduling indication | X | Bandwidth related |
| | Time domain data | 4 | |
| | VRB-to-PRB mapping criterion | 1 | |
| | Format adjustment | 5 | |
| | Transport block scaling factor | 2 | |
| | Reserved bit | X | |

When the message content field indicates the specific content of the short message, the newly added indication field may alternatively be some of reserved bits, as shown in Table 4.

TABLE 4

| Field | | Bit quantity | Remarks |
|---|---|---|---|
| Short message indication | | 1 | "0" indicates a short message; and "1" indicates a message for terminal paging. |
| If a "short message indication" is 0, the short message is indicated, and content of the "message content" field is set as follows: | | | |
| Message content | Short message content | [8] | Defined at a higher layer |
| | Newly added indication | N | "Null" indicates no message for terminal paging; and non-null indicates a preset time point for sending the message for terminal paging. |
| | Reserved bit | | |
| If a "short message indication" is 1, the message for terminal paging is indicated, and content of the "message content" field is set as follows: | | | |
| Message content | Frequency domain scheduling indication | X | Bandwidth related |
| | Time domain data | 4 | |
| | VRB-to-PRB mapping criterion | 1 | |
| | Format adjustment | 5 | |
| | Transport block scaling factor | 2 | |
| | Reserved bit | X | |

In this way, the terminal device may determine, based on the short message indication field in the received paging message, whether the paging message is the message for terminal paging or the short message. In addition, the terminal device may obtain, from the message content field, specific message content of the short message or DCI information. Further, based on the newly added indication field, the terminal device may determine whether the message for terminal paging needs to be received, and determine a specific time for receiving the message for terminal paging.

It should be noted that Table 3 and Table 4 are merely examples for understanding the solutions of the present invention. In this embodiment of the present invention, the "short message indication" may alternatively be set to 1 to indicate the short message, or may be set to 0 to indicate the message for terminal paging. Certainly, the "short message indication" may alternatively be set to another identifier, provided that the short message and the message for terminal paging can be distinguished. The "short message indication" set to the another identifier shall fall within the protection scope of the embodiments of the present invention.

The newly added indication field may be set to a preset time point to indicate the terminal device to receive, at the preset time point, the message for terminal paging, and may be set to null to indicate that the terminal device does not need to receive the message for terminal paging. Therefore, when determining that the newly added indication field is null, the terminal device may determine that the terminal device does not need to receive the message for terminal paging, and end the processing. When determining that the newly added indication field includes data content, the terminal device may determine that the terminal device needs to receive the message for terminal paging, and determine that the message for terminal paging is to be received at a time corresponding to the data content included in the newly added indication field.

Alternatively, the newly added indication field may be divided into two parts, and the two parts are separately encoded. A first part is used to indicate whether the terminal device needs to receive the message for terminal paging. A second part is used to indicate the preset time point for sending the message for terminal paging. The first part may include 1 bit. "1" may be used to indicate that the terminal device needs to receive the message for terminal paging, and "0" may be used to indicate that the terminal device does not need to receive the message for terminal paging. Certainly, "0" may alternatively be used to indicate that the terminal device needs to receive the message for terminal paging, and "1" may be used to indicate that the terminal device does not need to receive the message for terminal paging. When the first part is used to indicate that the terminal device does not need to receive the message for terminal paging, the second part may be null. Therefore, when the first part indicates that the terminal device needs to receive the message for terminal paging, the terminal device may decode the second part to obtain the preset time point. When the first part indicates that the terminal device does not need to receive the message for terminal paging, the terminal device may not decode the second part. In this manner, when the access network device does not send the second paging message, the access network device sets a first part of a newly added indication field in the first paging message to "0". Therefore, the terminal may not decode a second part after decoding the first part. In comparison with decoding of all bits included in the newly added indication field, this manner can reduce decoding complexity of the terminal device.

For ease of description, the paging message transmission method provided in the embodiments of this application is described below by using an example in which the short message indication field is set to "0" to indicate a short message, the short message indication field is set to "1" to indicate a message for terminal paging, and the preset time point is a moment three slots apart from the first PO in the current paging cycle. This is only an example for description, and does not constitute a limitation on the embodiments of this application.

In an embodiment of a possible implementation, the access network device may perform step S501 when determining that two messages, namely, the message for terminal paging and the short message, need to be sent on the first PO in the current paging cycle.

When the access network device needs to send the short message and the message for terminal paging, the short message indication field may be set to "0". The message content field is set to specific content of the short message. The newly added indication field is set to the preset time point for sending the message for terminal paging. Based on the message format shown in Table 3, the first paging message may be shown in Table 5.

TABLE 5

| Field | | Data content |
| --- | --- | --- |
| Short message indication | | 0 |
| Newly added indication | | 11 |
| Message content | Short message content Reserved bit | Specific message content |

Based on the message format shown in Table 4, the first paging message may be shown in Table 6.

TABLE 6

| Field | | Data content |
| --- | --- | --- |
| Short message indication | | 0 |
| Message content | Short message content Newly added indication Reserved bit | Specific message content 11 |

If the access network device determines that only the short message needs to be sent in the current paging cycle, the short message indication field in the paging message may be set to "0". The message content field is set to specific content of the short message. The newly added indication field is set to null. Based on the message format shown in Table 3, a paging message including the short message may be shown in Table 7.

TABLE 7

| Field | | Data content |
| --- | --- | --- |
| Short message indication | | 0 |
| Newly added indication | | Null |
| Message content | Short message content Reserved bit | Specific message content |

Based on the message format shown in Table 4, the first paging message may be shown in Table 8.

TABLE 8

| Field | | Data content |
| --- | --- | --- |
| Short message indication | | 0 |
| Message content | Short message content Newly added indication Reserved bit | Specific message content Null |

If the access network device determines that only the message for terminal paging needs to be sent in the current paging cycle, the short message indication field in the paging message may be set to "1". The message content field is set to DCI information of the message for terminal paging. The newly added indication field is set to null. Based on the message format shown in Table 3, a paging message including the message for terminal paging may be shown in Table 9.

TABLE 9

| Field | Data content |
| --- | --- |
| Short message indication | 1 |
| Newly added indication | Null |
| Message content | DCI information |

Based on the message format shown in Table 4, the first paging message may be shown in Table 10.

TABLE 10

| Field | Data content |
| --- | --- |
| Short message indication | 1 |
| Newly added indication | Null |
| Message content | DCI information |

The access network device may further send a pilot signal to the terminal device, where the pilot signal is used to assist the terminal device in receiving the second paging message. In this way, the terminal device may perform time synchronization or/and frequency synchronization based on the pilot signal and a pilot signal included in the second paging message. This can improve precision of demodulating the second paging message by the terminal device.

In an embodiment of a possible implementation, the access network device may send the scheduling information to the terminal device in a preset time point-frequency resource set CORESET and a preset search space. The preset time point-frequency resource set is a time-frequency resource set carrying the first paging message, and the preset search space is a search space carrying the first paging message.

Figure 10:
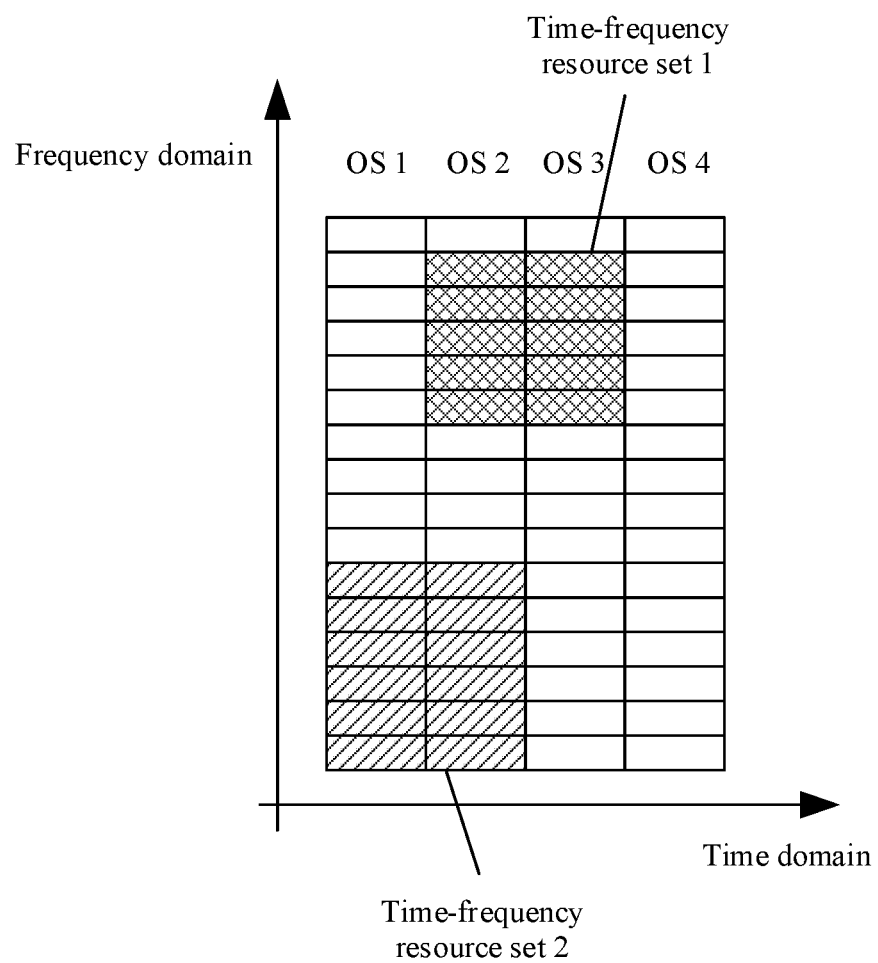
FIG. 10 is a schematic diagram of a time-frequency resource set according to this application.
Figure 11:
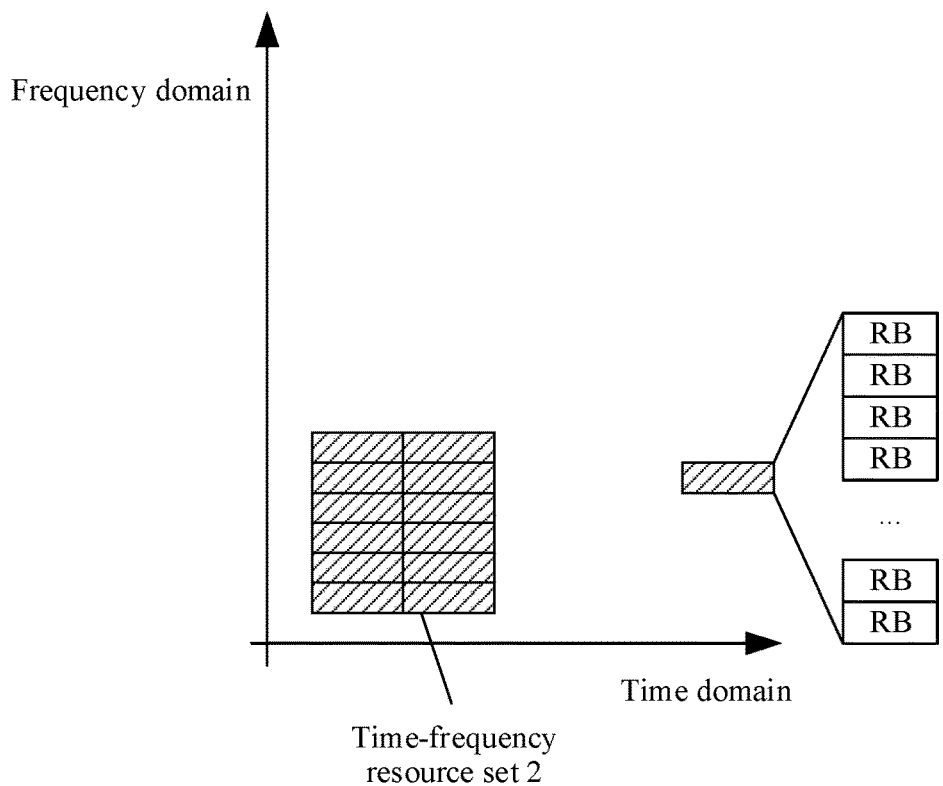
FIG. 11 is a schematic diagram of a CCE according to this application.

The CORESET is a concept newly introduced to the 5G system. The CORESET is a time-frequency resource set used to carry a PDCCH. As shown in FIG. 10, one CORESET includes a plurality of transmission control channel elements (CCE) in frequency domain. As shown in FIG. 11, one CCE includes several resource blocks (RB). A time-frequency resource range of the CORESET is configured through a higher layer parameter CORESET-freq-dom. Time domain duration $N_{symb}^{CORESET} \in \{1,2,3\}$ is configured through a higher layer parameter CORESET-time-dur.

Figure 12:
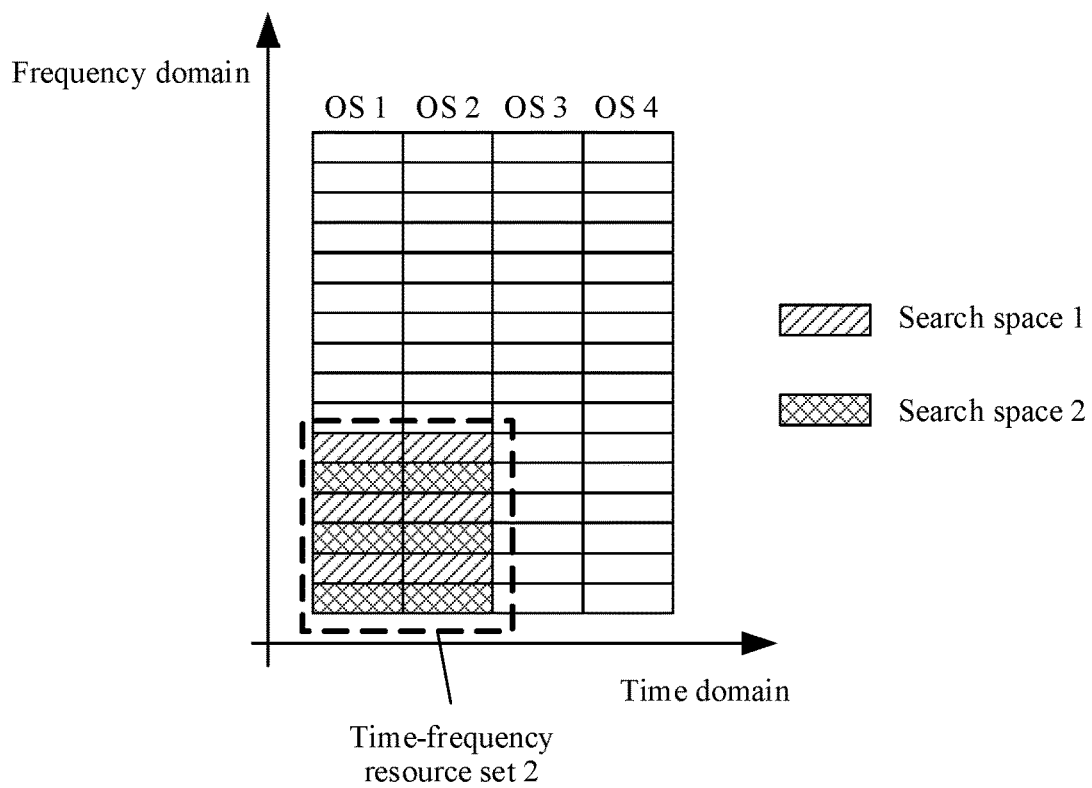
FIG. 12 is a schematic diagram of a search space according to this application.

DCI information is transmitted on several CCEs of a PDCCH. Generally, CCEs on which the PDCCH is transmitted cannot be accurately determined in advance. Usually, when the PDCCH is configured, the terminal device is notified of only possible CCEs on which data is to be transmitted. Such a possible CCE set is referred to as a search space, as shown in FIG. 12.

In this embodiment of this application, the access network device sends the DCI information of the second paging message by using a CORESET and a search space that are used for sending the first paging message on the first PO in the current paging cycle. In this case, when blindly detecting the DCI information of the second paging message, the terminal device may blindly detect only the CORESET and the search space that correspond to the first PO in the current paging cycle, and the access network device may not need to reconfigure a CORESET and a search space for the second paging message. In addition, the access network device limits the search space for the second paging message, to narrow a scope in which the terminal device performs blind detection. This can improve blind detection efficiency of the terminal device.

Figure 13:
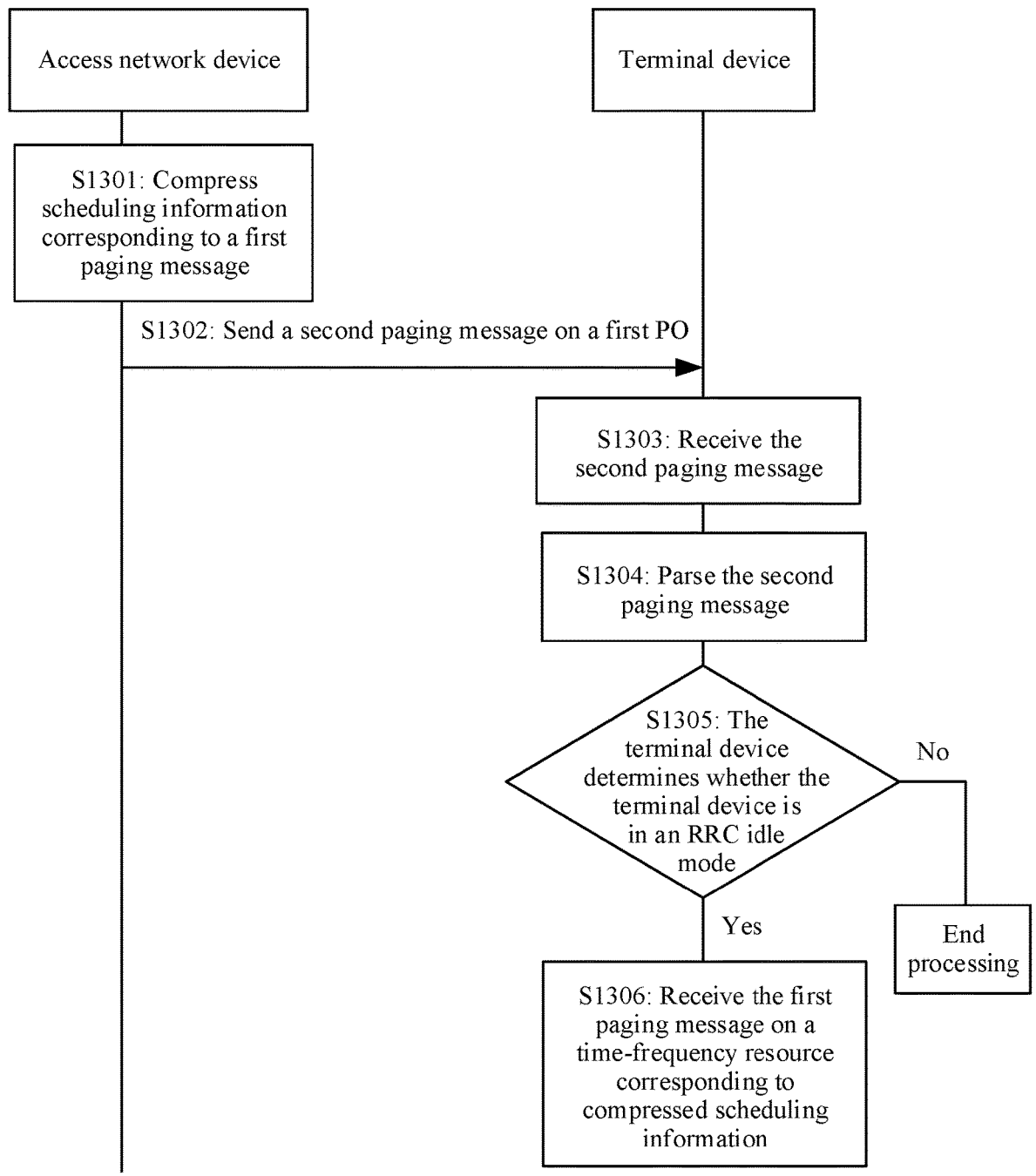
FIG. 13 is a schematic flowchart of a paging message transmission method according to this application.

An embodiment of this application provides a second paging message transmission method, where the method may also be used to resolve a problem of poor user experience that is caused after demodulation complexity of a terminal in an RRC connected mode is reduced. As shown in FIG. 13, the method includes the following steps.

S1301: An access network device compresses scheduling information corresponding to a first paging message, where a quantity of bits occupied by compressed scheduling information is not greater than a preset bit quantity.

The preset bit quantity may be a quantity of bits included in reserved bits in a second paging message. The first paging message is a message for terminal paging, and the second paging message is a short message.

S1302: The access network device sends the second paging message to a terminal device on a first PO, and sends the first paging message on a time-frequency resource corresponding to the compressed scheduling information, where the second paging message includes the compressed scheduling information.

S1303: The terminal device receives, on the first PO, the second paging message sent by the access network device.

S1304: The terminal device parses the second paging message.

S1305: The terminal device determines whether the terminal device is in an RRC idle mode. If the terminal device is in an RRC idle mode, the terminal device performs step S1306. If the terminal device is not in an RRC idle mode, the processing ends.

S1306: The terminal device receives the first paging message on the time-frequency resource corresponding to the compressed scheduling information.

In this embodiment of this application, the access network device compresses the scheduling information corresponding to the first paging message, to reduce a quantity of bits occupied by the scheduling information. In this way, the scheduling information can be carried in the reserved bits in the second paging message. Therefore, on the premise that demodulation complexity of the terminal device is not increased, the terminal device can receive the message for terminal paging and the short message on the first PO in a current paging cycle. This can improve user experience.

In an embodiment of a possible implementation, the access network device may compress, by limiting a mapping mode of the first paging message on a frequency domain resource, the scheduling information corresponding to the first paging message.

The access network device may use, but not limited to, at least one of the following three manners to limit the mapping mode of the first paging message on the frequency domain resource.

Manner 1: The access network device maps the first paging message starting from a preset position on the frequency domain resource.

Figure 14:
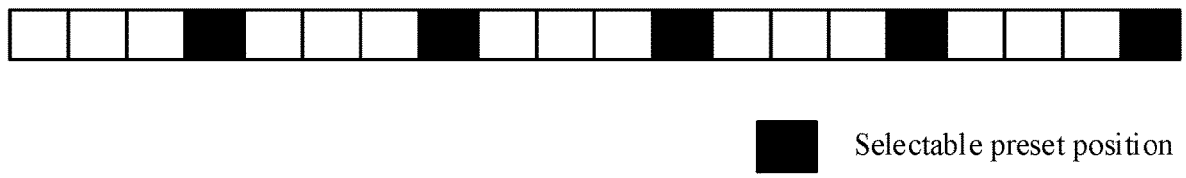
FIG. 14 is a schematic diagram of a preset position according to this application.
Figure 14:

The preset position may refer to a $4k^{th}$ physical resource block (PRB) on the frequency domain resource. Therefore, the access network device maps the first paging message starting from the $4k^{th}$ PRB on the frequency domain resource, where k is an integer not less than 0. Assuming that the frequency domain resource includes 20 PRBs, if the access network device does not limit the mapping mode of the first paging message on the frequency domain resource, the access network device may map the first paging message starting from any one of the 20 PRBs. In this case, 20 types of mapping modes may be used for the first paging message, and 5 bits in the scheduling information of the first paging message need to be used to indicate the mapping mode of the first paging message. If the access network device limits the mapping mode of the first paging message on the frequency domain resource, the access network device may map the first paging message starting from a $4k^{th}$ PRB in the 20 PRBs. In this case, four types of mapping modes may be used for the first paging message, as shown in FIG. 14, and the access network device may map the first paging message starting from any one of five preset positions shown in FIG. 14. 2 bits in the scheduling information of the first paging message need to be used to indicate the mapping mode of the first paging message. It can be learned that a quantity of bits occupied by the scheduling information of the first paging message is reduced by 3 bits.

Manner 2: The access network device maps the first paging message onto the frequency domain resource in a non-interleaved mapping mode.

Assuming that the frequency domain resource includes three PRBs, if the access network device does not limit the mapping mode of the first paging message on the frequency domain resource, the access network device may map the first paging message onto the three PRBs in an interleaved mapping mode and/or a non-interleaved mapping mode. In this case, at least 27 types of mapping modes may be used for the first paging message, and 5 bits in the scheduling information of the first paging message need to be used to indicate the mapping mode of the first paging message. If the access network device limits the mapping mode of the first paging message on the frequency domain resource, the access network device maps the first paging message onto the three PRBs in a non-interleaved mapping mode. In this case, at most three types of mapping modes may be used for the first paging message, and 2 bits in the scheduling information of the first paging message need to be used to indicate the mapping mode of the first paging message. It can be learned that a quantity of bits occupied by the scheduling information of the first paging message is reduced by 3 bits.

Manner 3: The access network device reduces types of modulation formats available for the first paging message. If the access network device does not limit the mapping mode of the first paging message on the frequency domain resource, the access network device may demodulate the first paging message by using a modulation format such as signal binary modulation, quaternary quadrature amplitude modulation, 16 quadrature amplitude modulation, 64 quadrature amplitude modulation, binary frequency shift keying, multi-ary frequency shift keying, binary phase shift keying, multi-ary phase shift keying, binary digital modulation, or multi-ary digital modulation. In this case, at least 10 types of mapping modes may be used for the first paging message, and 5 bits in the scheduling information of the first paging message need to be used to indicate the mapping mode of the first paging message. If the access network device limits the mapping mode of the first paging message on the frequency domain resource, the access network device reduces types of modulation formats available for the first paging message to four types. In this case, 2 bits in the scheduling information of the first paging message need to be used to indicate the mapping mode of the first paging message. It can be learned that a quantity of bits occupied by the scheduling information of the first paging message is reduced by 3 bits.

The second paging message may further include a second identifier, and the second identifier is used to indicate the terminal device to receive the first paging message. In this way, when determining that the second paging message includes the second identifier, the terminal device may decode a field, in the second paging message, carrying the scheduling information. This can reduce decoding complexity of the terminal device.

In a current 5G system, some system information (SI) is sent on demand. In other words, an access network device sends the system information by broadcast or through dedicated signaling only after UE requests the system information. Remaining minimum system information (e.g., remaining minimum SI, or RMSI) or a system information block 1 (SIB1) includes broadcast status indication information (for example, si-BroadcastStatus) corresponding to each piece of system information, to indicate whether corresponding SI is currently being broadcast. For example, if a terminal device 1 requires system information SI-1, but the access network device does not currently broadcast the SI-1, the terminal device 1 may initiate a request to the access network device. After receiving the request initiated by the terminal device 1, the access network device broadcasts the SI-1, and modifies broadcast status indication information that corresponds to the SI-1 and that is in a SIB 1, so that modified broadcast status indication information of the SI-1 is used to indicate that the SI-1 is currently being broadcast. If a terminal device 2 also requires the SI-1, the terminal device 2 may determine, based on the modified broadcast status indication information that is of the SI-1 and that is in the SIB 1, that the SI-1 is currently being broadcast. Then, the terminal device 2 may directly listen to and receive the SI-1 and does not need to send a request to the base station.

In the foregoing mechanism, the broadcast status indication information of the system information is included in the SIB 1 and is sent. If a broadcast status of system information changes, broadcast status indication information that corresponds to the system information and that is in the SIB 1 needs to be modified, and the SIB 1 is updated. In the 5G system, a plurality of pieces of system information sent by using an on-demand sending mechanism may be defined, and different terminal devices may request different system information. If there are terminal devices constantly requesting system information, a large amount of broadcast status indication information corresponding to the system information changes. Consequently, the SIB 1 is frequently updated. If the SIB 1 is updated, the access network device needs to send a paging message to the terminal device to notify the terminal device of the update of the SIB 1. After receiving the paging message carrying SIB 1 update indication information, the terminal device needs to reread the SIB 1. However, when broadcast status indication information of system information SI-2 sent on demand changes, the SIB 1 is updated and the access network device sends, to the terminal device, a paging message carrying SIB 1 update indication information. In this case, if the terminal device does not need the SI-2, the terminal device still needs to reread the SIB 1 after receiving the paging message carrying the SIB 1 update indication information. Unnecessary waste is caused.

In view of this, an embodiment of this application further provides a third paging message transmission method, to avoid radio resource waste caused by frequent reading of unnecessary SIB 1 information by a terminal device. The method may be used independently, or may be used in combination with the first paging message transmission method shown in FIG. 5 to FIG. 12, or may be used in combination with the second paging message transmission method shown in FIG. 13 and FIG. 14.

The third paging message transmission method includes the following step: An access network device sends a paging message to the terminal device, where the paging message is used to indicate that first system information is updated, and the first system information may be RMSI, or may be a SIB 1. The paging message may further include but is not limited to any one of the following three types of indication information: first indication information, second indication information, and third indication information.

The first indication information is used to indicate that the update of the first system information is caused by a change of a broadcast status of second system information, and the second system information is system information sent by the access network device based on a requirement of the terminal device. Alternatively, the first indication information is used to indicate that the update of the first system information is not caused by a change of a broadcast status of second system information. The first indication information may occupy 1 bit. "1" may be used to indicate that the update of the first system information is caused by the change of the broadcast status of the second system information, and "0" may be used to indicate that the update of the first system information is not caused by the change of the broadcast status of the second system information. Certainly, for the first indication information, "0" may alternatively be used to indicate that the update of the first system information is caused by the change of the broadcast status of the second system information, and "1" may be used to indicate that the update of the first system information is not caused by the change of the broadcast status of the second system information.

Therefore, when receiving the paging message sent by the access network device, the terminal device may determine, based on the first indication information carried in the paging message, whether the first system information needs to be read. If the first indication information is used to indicate that the update of the first system information is not caused by the change of the broadcast status of the second system information, the terminal device needs to reread the first system information regardless of whether the second system information needs to be received. If the first indication information is used to indicate that the update of the first system information is caused by the change of the broadcast status of the second system information, and the terminal device needs to receive the second system information, the terminal device needs to reread the first system information. If the first indication information is used to indicate that the update of the first system information is caused by the change of the broadcast status of the second system information, but the terminal device does not need to receive any second system information, the terminal device does not need to reread the first system information. This can reduce waste caused by frequent reading of the first system information.

The second indication information may include an identifier corresponding to at least one piece of second system information. Herein, the at least one piece of second system information may be all system information sent by the access network device based on a requirement of the terminal device, or may be partial system information sent by the access network device based on a requirement of the terminal device. Herein, if there are sufficient remaining bits in the paging message, the second indication information includes all system information sent by the access network device based on the requirement of the terminal device. If there are insufficient remaining bits in the paging message, the second indication information includes partial system information sent by the access network device based on the requirement of the terminal device. In this embodiment of this application, the at least one piece of second system information may be selected based on a number of each piece of second system information. For example, second system information with a smaller number is selected, or second system information with a larger number is selected. Alternatively, the at least one piece of second system information may be randomly selected, or may be selected in another manner. A manner of selecting the at least one piece of second system information is not specifically limited herein in this embodiment of this application. Herein, the second indication information may occupy a plurality of bits. The second indication information may indicate, by using a bitmap, the identifier corresponding to the at least one piece of second system information. A bitmap method is to use each bit to store a status. For example, 0 is used to indicate a status, and 1 is used to indicate another status. In this embodiment of this application, the bitmap method is used to indicate the second indication information. It is assumed that 0 is used to indicate that a broadcast status of the system information does not change or that a change of a broadcast status of the system information is not caused by an on-demand request of the terminal device, and 1 indicates that the change of the broadcast status of the system information is caused by the on-demand request of the terminal device. In this case, if there are four pieces of system information in a system that use an on-demand sending mechanism, each piece of system information corresponds to 1 bit, a broadcast status of a first piece of system information changes, but broadcast statuses of the other three pieces of system information do not change, second information may be set to 1000. Therefore, after receiving 1000, the terminal device may determine that a broadcast status of the first system information changes.

In this way, when receiving the paging message sent by the access network device, the terminal device may determine, based on the second indication information carried in the paging message, whether the first system information needs to be read. If the second indication information includes the identifier corresponding to the second system information that needs to be received by the terminal device, the terminal device needs to reread the first system information. If the second indication information does not include the identifier corresponding to the second system information that needs to be received by the terminal device, or the terminal device does not need to receive any second system information, the terminal device does not need to reread the first system information. This can reduce waste caused by frequent reading of the first system information.

The third indication information may include broadcast status indication information corresponding to at least one piece of second system information. Herein, the at least one piece of second system information may be all system information sent by the access network device based on a requirement of the terminal device, or may be partial system information sent by the access network device based on a requirement of the terminal device. Herein, if there are sufficient remaining bits in the paging message, the second indication information includes all system information sent by the access network device based on the requirement of the terminal device. If there are insufficient remaining bits in the paging message, the second indication information includes partial system information sent by the access network device based on the requirement of the terminal device. In this embodiment of this application, the at least one piece of second system information may be selected based on a number of each piece of second system information. For example, second system information with a smaller number is selected, or second system information with a larger number is selected. Alternatively, the at least one piece of second system information may be randomly selected, or may be selected in another manner. A manner of selecting the at least one piece of second system information is not specifically limited herein in this embodiment of this application. Herein, the third indication information may occupy a plurality of bits. The third indication information may indicate, by using a bitmap (bitmap), an identifier and the broadcast status indication information that correspond to the at least one piece of second system information. It is assumed that 0 is used to indicate that a broadcast status of the system information is a state of not being broadcast, and 1 is used to indicate that a broadcast status of the system information is a state of being broadcast. In this case, if there are four pieces of system information in the system that use an on-demand sending mechanism, each piece of system information corresponds to 1 bit, the access network device is broadcasting a first piece of system information based on a requirement of the terminal device, and the other three pieces of system information are not broadcast, third information may be set to 1000. Therefore, after receiving 1000, the terminal device may determine that the first system information is being broadcast.

In this way, when receiving the paging message sent by the access network device, the terminal device may learn, based on the third indication information carried in the paging message, of a broadcast status of system information required by the terminal device. The terminal device does not need to learn of the broadcast status of the second system information by obtaining, through the SIB 1, the broadcast status indication information corresponding to the second system information that needs to be received. This can reduce waste caused by frequent reading of the first system information.

Optionally, the third indication information may further include the identifier corresponding to the at least one piece of second system information.

In an embodiment of a possible implementation, when the access network device determines that the update of the first system information is caused by the change of the broadcast status of the second system information, the paging message may include any one of the foregoing three messages. When the access network device determines that the update of the first system information is not caused by the change of the broadcast status of the second system information, or the update of the first system information is caused not only by the change of the broadcast status of the second system information, the paging message may not include the foregoing three types of information. In this way, the terminal device may reread system information when determining that the paging message does not include the foregoing three types of information.

For example, the paging message may be a short message, or may be a message for terminal paging.

The paging message in this embodiment of this application may alternatively be considered as special system information.

Figure 15:
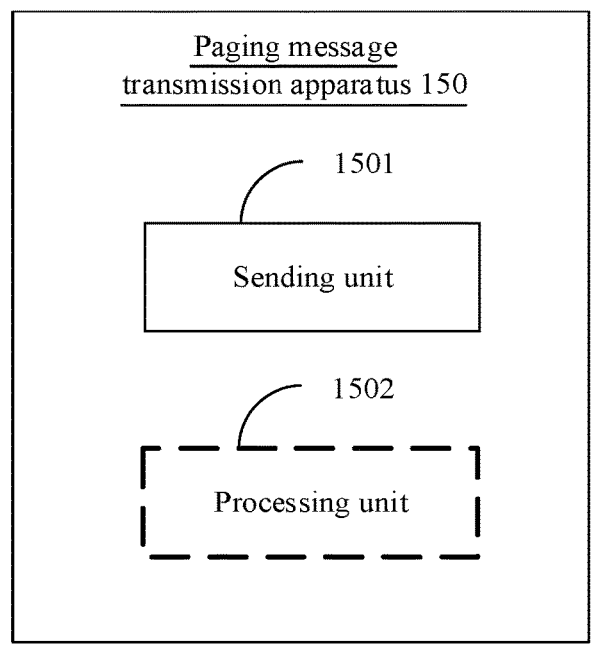
FIG. 15 is a schematic structural diagram of a paging message transmission apparatus according to this application.

An embodiment of this application provides a paging message transmission apparatus. The paging message transmission apparatus is configured to implement functions of the access network device in the paging message transmission method shown in FIG. 5 to FIG. 12. As shown in FIG. 15, a paging message transmission apparatus 150 includes a sending unit 1501. The sending unit 1501 is configured to send a first paging message to a terminal device on a first paging occasion, where the first paging message includes a first identifier and a preset time point for sending a second paging message, the first identifier is used to identify that the first paging message is a short message, and the second paging message is a message for terminal paging. The sending unit 1501 is further configured to: send, to the terminal device at the preset time point, scheduling information corresponding to the second paging message, and send the second paging message on a time-frequency resource corresponding to the scheduling information.

In an embodiment of a possible implementation, the paging message transmission apparatus 150 may further include a processing unit 1502, configured to process signaling, data, or the like received by the paging message transmission apparatus 150.

Duration of an interval between the preset time point and the first paging occasion may be less than a paging cycle.

For example, the first paging message may further include a second identifier, and the second identifier is used to indicate the terminal device to receive the second paging message.

In an embodiment of a possible implementation, the sending unit 1501 may be further configured to send a pilot signal to the terminal device, where the pilot signal is used to assist the terminal device in receiving the second paging message.

In an embodiment of a possible implementation, the sending unit 1501 may be specifically configured to send the scheduling information to the terminal device in a preset time point-frequency resource set and a preset search space at the preset time point. The preset time point-frequency resource set is a time-frequency resource set carrying the first paging message, and the preset search space is a search space carrying the first paging message.

This embodiment of this application provides the paging message transmission apparatus. The paging message transmission apparatus may set a time for the second paging message based on a requirement, and notify the terminal device of time information, so that the terminal device can receive the second paging message within the time notified by the paging message transmission apparatus, and the second paging message does not need to wait to be sent on the paging occasion in a subsequent paging cycle. This avoids a problem that the paging message is not sent in time, and improves user experience without increasing demodulation complexity of the terminal device.

Figure 16:
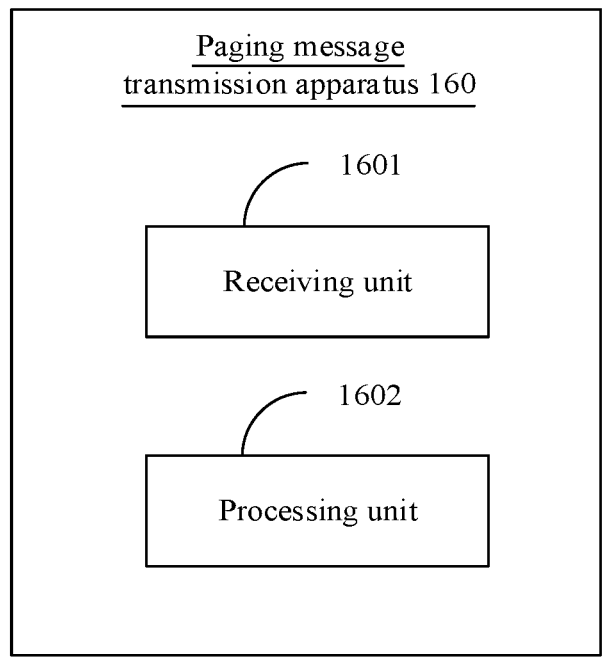
FIG. 16 is a schematic structural diagram of another paging message transmission apparatus according to this application.

An embodiment of this application provides a paging message transmission apparatus. The paging message transmission apparatus is configured to implement functions of the terminal device in the paging message transmission method shown in FIG. 5 to FIG. 12. As shown in FIG. 16, a paging message transmission apparatus 160 includes a receiving unit 1601 and a processing unit 1602. The receiving unit 1601 is configured to receive, on a first paging occasion, a first paging message sent by an access network device, where the first paging message includes a first identifier and a preset time point for sending a second paging message, the first identifier is used to identify that the first paging message is a short message, and the second paging message is a message for terminal paging. The processing unit 1602 is configured to parse the first paging message received by the receiving unit 1601. The receiving unit 1601 is further configured to: when the apparatus is in a radio resource control RRC idle mode, receive, at the preset time point obtained by the processing unit 1602 through parsing, scheduling information that corresponds to the second paging message and that is sent by the access network device; and receive, on a time-frequency resource corresponding to the scheduling information, the second paging message sent by the access network device.

For example, duration of an interval between the preset time point and the first paging occasion may be less than a paging cycle.

For example, the first paging message may further include a second identifier, and the second identifier is used to indicate the terminal device to receive the second paging message.

In an embodiment of a possible implementation, the receiving unit 1601 may be further configured to receive a second pilot signal sent by the access network device, where the second pilot signal is used to assist the terminal device in receiving the second paging message. The processing unit 1602 is further configured to demodulate, based on the first pilot signal and the second pilot signal, the second paging message received by the receiving unit 1601.

In an embodiment of a possible implementation, the processing unit 1602 may be further configured to blindly detect the scheduling information in a preset time point-frequency resource set and a preset search space at the preset time point when the receiving unit 1601 receives, at the preset time point, the scheduling information sent by the access network device. The preset time point-frequency resource set is a time-frequency resource set carrying the first paging message, and the preset search space is a search space carrying the first paging message.

In this embodiment of this application, the paging message transmission apparatus may receive the second paging message at the preset time point notified by the access network device, and does not need to wait to receive the second paging message on the paging occasion in a subsequent paging cycle. This avoids a problem that the second paging message cannot be sent in time.

Figure 17:
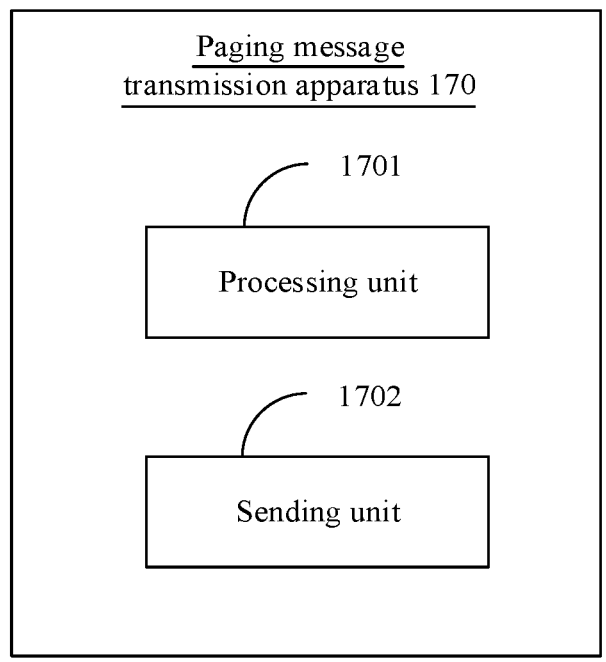
FIG. 17 is a schematic structural diagram of another paging message transmission apparatus according to this application.

An embodiment of this application provides a paging message transmission apparatus. The paging message transmission apparatus is configured to implement functions of the access network device in the paging message transmission method shown in FIG. 13 and FIG. 14. As shown in FIG. 17, a paging message transmission apparatus 170 includes a processing unit 1701 and a sending unit 1702. The processing unit 1701 is configured to compress scheduling information corresponding to a first paging message, where the first paging message is a message for terminal paging, and a quantity of bits occupied by compressed scheduling information is not greater than a preset bit quantity. The sending unit 1702 is configured to: send a second paging message to a terminal device on a first paging occasion, and send the first paging message on a time-frequency resource corresponding to the compressed scheduling information. The second paging message includes a first identifier and the scheduling information obtained through compression performed by the processing unit. The first identifier is used to identify that the second paging message is a short message.

In an embodiment of a possible implementation, the processing unit 1701 may be specifically configured to limit a mapping mode of the first paging message on a frequency domain resource.

In an embodiment of a possible implementation, the processing unit 1701 may be specifically configured to map the first paging message starting from a preset position on the frequency domain resource. Alternatively, the processing unit 1701 may be specifically configured to map the first paging message onto the frequency domain resource in a non-interleaved mapping mode. Alternatively, the processing unit 1701 may be specifically configured to reduce types of modulation formats available for the first paging message.

For example, the second paging message may further include a second identifier, and the second identifier is used to indicate the terminal device to receive the first paging message.

In this embodiment of this application, the paging message transmission apparatus compresses the scheduling information corresponding to the first paging message, to reduce a quantity of bits occupied by the scheduling information. In this way, the scheduling information can be carried in reserved bits in the second paging message. Therefore, on the premise that demodulation complexity of the terminal device is not increased, the terminal device can receive the message for terminal paging and the short message on the first paging occasion in a current paging cycle. This can improve user experience.

Figure 18:
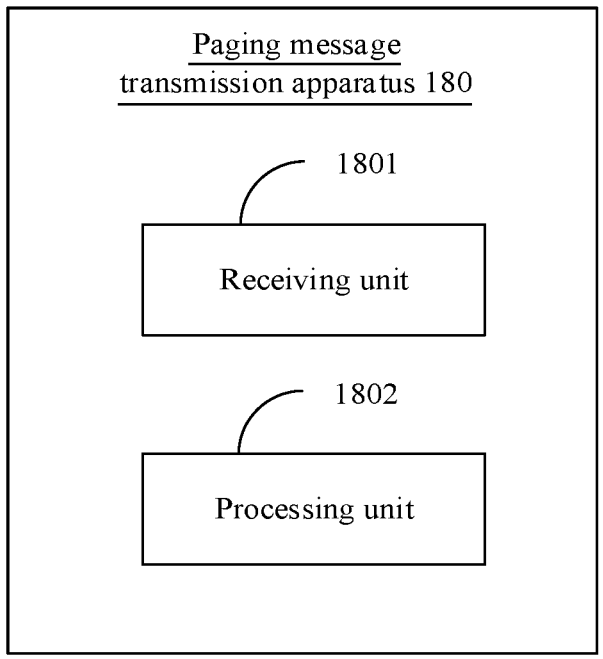
FIG. 18 is a schematic structural diagram of another paging message transmission apparatus according to this application.

An embodiment of this application provides a paging message transmission apparatus. The paging message transmission apparatus is configured to implement functions of the terminal device in the paging message transmission method shown in FIG. 13 and FIG. 14. As shown in FIG. 18, a paging message transmission apparatus 180 includes a receiving unit 1801 and a processing unit 1802. The receiving unit 1801 is configured to receive, on a first paging occasion, a first paging message sent by an access network device, where the first paging message includes a first identifier and scheduling information. The first identifier is used to identify that the first paging message is a short message. The scheduling information is used to indicate a time-frequency resource carrying a second paging message, and a quantity of bits occupied by the scheduling information is not greater than a preset bit quantity. The second paging message is a message for terminal paging. The processing unit 1802 is configured to parse the first paging message received by the receiving unit 1801. The receiving unit 1801 is further configured to: when the terminal device is in a radio resource control RRC idle mode, receive the second paging message on the time-frequency resource that corresponds to the scheduling information and that is obtained by the processing unit 1802 through parsing.

For example, the scheduling information may be determined by the access network device by limiting a mapping mode of the second paging message on a frequency domain resource.

For example, the first paging message may further include a second identifier, and the second identifier is used to indicate the terminal device to receive the second paging message.

In this embodiment of this application, the paging message transmission apparatus compresses the scheduling information corresponding to the second paging message, to reduce a quantity of bits occupied by the scheduling information. In this way, the scheduling information can be carried in reserved bits in the first paging message. Therefore, on the premise that demodulation complexity of the terminal device is not increased, the terminal device can receive the message for terminal paging and the short message on the first paging occasion in a current paging cycle. This can improve user experience.

The foregoing describes the solutions provided in the embodiments of the present invention mainly from the perspective of interaction between network elements. It can be understood that, to implement the foregoing functions, the network elements, for example, a terminal device and an access device, include corresponding hardware structures and/or software modules for performing the functions. A person of ordinary skill in the art should easily be aware that, in combination with the examples described in the embodiments disclosed in this specification, units and algorithms steps in the present invention may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

Figure 19:
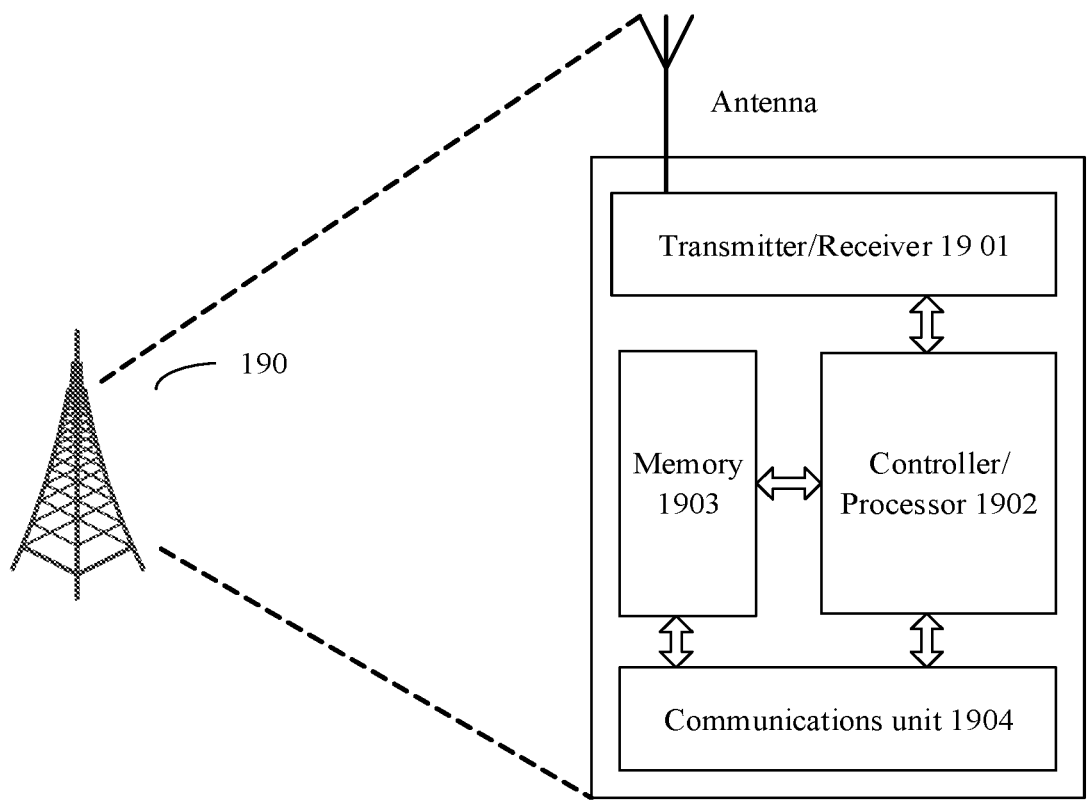
FIG. 19 is a schematic structural diagram of an access network device according to this application.

FIG. 19 is a possible schematic structural diagram of an access network device 190 related to the foregoing embodiments.

The access network device 190 includes a transmitter/receiver 1901, a controller/processor 1902, a memory 1903, and a communications unit 1904. The transmitter/receiver 1901 may be configured to support the access network device 190 in sending a paging message to the terminal device related to the foregoing embodiments. The controller/processor 1902 performs various functions for communicating with the terminal device. On a downlink, the paging message is processed by the controller/processor 1902 and is demodulated by the transmitter/receiver 1901 to generate a downlink signal, and the downlink signal is transmitted to the terminal device through an antenna. The controller/processor 1902 further performs processing processes, in FIG. 5 to FIG. 14, that relate to the access network device 190, and/or is configured to perform another process of the technology described in this application. The memory 1903 is configured to store program code and data for the access network device 190. The communications unit 1904 is configured to support the access network device 190 in communicating with another network entity. For example, the communications unit 1904 is configured to support the access network device 190 in communicating with the terminal device. For example, the another network entity is an MME, an SGW, and/or a PGW in a core network EPC.

Figure 20:
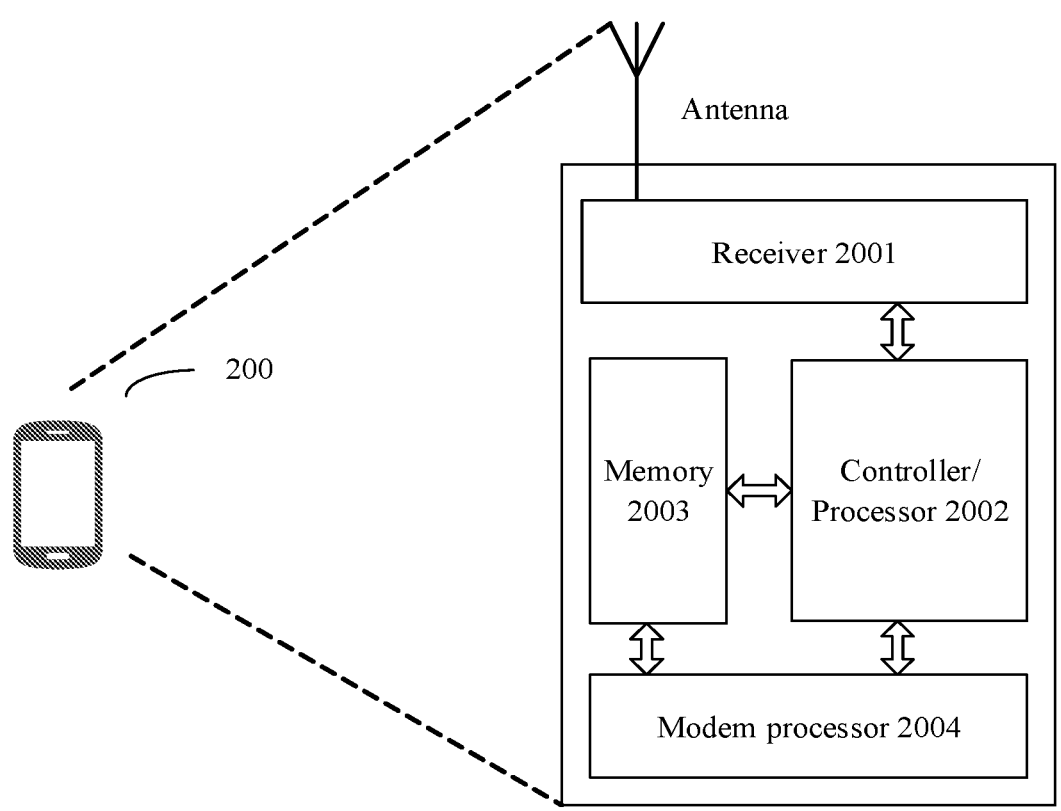
FIG. 20 is a schematic structural diagram of a terminal device according to this application.

FIG. 20 is a simplified schematic diagram of a possible design structure of a terminal device 200 related to the foregoing embodiments. The terminal device 200 includes a receiver 2001, a controller/processor 2002, a memory 2003, and a modem processor 2004.

The receiver 2001 adjusts (for example, through filtering, amplification, down-conversion, and digitization) a signal received through an antenna and provides an input sample. In the modem processor 2004, an encoder receives a paging message and processes (for example, formats, encodes, and interleaves) the paging message. A modulator further processes (for example, performs symbol mapping and modulation) a decoded paging message and provides an output sample. A demodulator processes (for example, demodulates) the input sample and provides symbol estimation. A decoder processes (for example, de-interleaves and decodes) the symbol estimation and provides the decoded paging message sent to the terminal device 200. The encoder, modulator, demodulator, and decoder may be implemented by the combined modem processor 2004. These units perform processing based on a radio access technology (for example, an access technology of an LTE system or another evolution system) used by a radio access network.

The controller/processor 2002 controls and manages an action of the terminal device and is configured to perform processing performed by the terminal device 200 in the foregoing embodiments. For example, the controller/processor 2002 is configured to control the terminal device 200 to: receive a second paging message at a preset time point and/or perform another process of a technology described in the present invention. For example, the controller/processor 2003 is configured to support the terminal device 200 in performing steps 502, 504, and 505 in FIG. 5, or is configured to support the terminal device 200 in performing steps 1303, 1304, 1305, and 1306 in FIG. 13. The memory 2003 is configured to store program code and data for the terminal device 200.

An embodiment of the present invention further provides a computer-readable storage medium, configured to store a computer software instruction that needs to be executed by the processor. The computer software instruction includes a program that needs to be executed by the processor.

An embodiment of this application provides a computer program product that includes an instruction. When the computer program product runs on a computer, the computer is enabled to perform the paging message transmission methods in FIG. 5 to FIG. 14.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device, system, and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or the processor of the another programmable data processing device generate an apparatus for implementing a specific function in one or more processes in the flowcharts and/or in one or more blocks in the block diagrams.

Alternatively, these computer program instructions may be stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

Alternatively, these computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

It is clear that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A paging message transmission method, comprising:
    generating, by an access network device, scheduling information corresponding to a first paging message, wherein the first paging message is a message for terminal paging, frequency domain information in the scheduling information indicates a mapping mode of the first paging message on a frequency domain resource, and the mapping mode indicates to start to map the first paging message at a preset position on the frequency domain resource; and
    sending, by the access network device, a second paging message to a terminal device when a first paging occasion arrives, and sending the first paging message on a time-frequency resource corresponding to the scheduling information, wherein the second paging message comprises a first identifier and the scheduling information, and the first identifier indicates the second paging message is a short message.

2. The method according to claim 1, wherein the method further comprises:
    compressing, by the access network device, the scheduling information corresponding to the first paging message comprising limiting, by the access network device, the mapping mode of the first paging message on the frequency domain resource, and wherein a quantity of bits occupied by compressed scheduling information is not greater than a preset bit quantity.

3. The method according to claim 1, wherein the limiting, by the access network device, the mapping mode of the first paging message on the frequency domain resource further comprises:
    mapping, by the access network device, the first paging message onto the frequency domain resource in a non-interleaved mapping mode; or reducing, by the access network device, types of modulation formats available for the first paging message.

4. The method according to claim 1, wherein the second paging message further comprises a second identifier that indicates the terminal device is to receive the first paging message.

5. A paging message transmission apparatus, comprising:
a processor to generate scheduling information corresponding to a first paging message, wherein the first paging message is a message for terminal paging, frequency domain information in the scheduling information indicates a mapping mode of the first paging message on a frequency domain resource, and the mapping mode indicates to start to map the first paging message at a preset position on the frequency domain resource; and
a transmitter, coupled with the processor, to: send a second paging message to a terminal device on a first paging occasion, and send the first paging message on a time-frequency resource corresponding to the scheduling information, wherein the second paging message comprises a first identifier and the scheduling information, and the first identifier indicates that the second paging message is a short message.

6. The apparatus according to claim 5, further comprising the processor to limit the mapping mode of the first paging message on the frequency domain resource, and wherein a quantity of bits occupied by compressed scheduling information is not greater than a preset bit quantity.

7. The apparatus according to claim 6, further comprising the processor to:
map the first paging message onto the frequency domain resource in a non-interleaved mapping mode; or
reduce types of modulation formats available for the first paging message.

8. The apparatus according to claim 5, wherein the second paging message further comprises a second identifier that indicates the terminal device is to receive the first paging message.

9. A paging message transmission method, comprising:
generating, by an access network device, scheduling information corresponding to a first paging message, wherein the first paging message is a message for terminal paging, frequency domain information in the scheduling information indicates a mapping mode of the first paging message on a frequency domain resource, and the mapping mode indicates to start to map the first paging message at a preset position on the frequency domain resource; and
sending, by the access network device, a second paging message to a terminal device when a first paging occasion arrives, and sending the first paging message on a time-frequency resource corresponding to the scheduling information, wherein the second paging message comprises a first identifier and the scheduling information, the first identifier indicates the second paging message comprises a short message.

10. The method according to claim 9, wherein the method further comprises:
sending, by the access network device, a pilot signal to the terminal device, wherein the pilot signal assists the terminal device in receiving the second paging message.

11. A communications apparatus, comprising:
a processor to generate scheduling information corresponding to a first paging message, wherein the first paging message is a message for terminal paging, frequency domain information in the scheduling information indicates a mapping mode of the first paging message on a frequency domain resource, and the mapping mode indicates to start to map the first paging message at a preset position on the frequency domain resource; and
a transmitter, coupled with the processor, to: send a second paging message to a terminal device when a first paging occasion arrives, and send the first paging message on a time-frequency resource corresponding to the scheduling information, wherein the second paging message comprises a first identifier and the scheduling information, the first identifier indicates the second paging message comprises a short message.

12. The apparatus according to claim 11, further comprising the transmitter to send a pilot signal to the terminal device, wherein the pilot signal assists the terminal device in receiving the second paging message.

* * * * *